US012323860B2

(12) United States Patent
Tao et al.

(10) Patent No.: US 12,323,860 B2
(45) Date of Patent: Jun. 3, 2025

(54) SERVICE CONTINUITY IMPLEMENTATION METHOD, RELATED APPARATUS, AND SYSTEM

(71) Applicant: Huawei Technologies Co., Ltd., Shenzhen (CN)

(72) Inventors: Zhenyu Tao, Shanghai (CN); Chuankui Jiang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 684 days.

(21) Appl. No.: 17/577,543

(22) Filed: Jan. 18, 2022

(65) Prior Publication Data

US 2022/0141747 A1 May 5, 2022

Related U.S. Application Data

(63) Continuation of application No. PCT/CN2020/097539, filed on Jun. 22, 2020.

(30) Foreign Application Priority Data

Jul. 18, 2019 (CN) .......................... 201910649087.8

(51) Int. Cl.
*H04W 36/00* (2009.01)
(52) U.S. Cl.
CPC .............................. *H04W 36/00222* (2023.05)
(58) Field of Classification Search
CPC ... H04W 88/16; H04W 76/12; H04W 12/069; H04W 28/24; H04W 48/14; H04W 88/02; H04W 88/08; H04W 92/02; H04W 12/00; H04W 12/02; H04W 12/06; H04W 12/08; H04W 12/71; H04W 12/72; H04W 24/04;
(Continued)

(56) References Cited

U.S. PATENT DOCUMENTS 9,191,865 B1 * 11/2015 Paczkowski .......... H04W 12/06
9,942,088 B2 * 4/2018 Yu ......................... H04W 24/04
(Continued)

FOREIGN PATENT DOCUMENTS

CN 1943211 A 4/2007
CN 102232312 A * 11/2011 ............ H04W 28/20
(Continued)

OTHER PUBLICATIONS

Translation of WO-2016165307-A1 (Year: 2024).*
(Continued)

*Primary Examiner* — Matthew C Sams
(74) *Attorney, Agent, or Firm* — Conley Rose, P.C.

(57) ABSTRACT

A service continuity implementation method, a related device, and a system, where when a user equipment is attached to a 2/3G network, a serving node device determines that the user equipment has a 5G capability or a user corresponding to the user equipment is a 5G user. Then, the serving node device selects a 5G gateway for the user equipment, and establishes a session with the 5G gateway. In this way, when the user equipment subsequently moves to a 5G network, the same 5G gateway serves the user equipment, and an address of the user may remain unchanged when the user equipment moves from the 2/3G network to the 5G network, thereby implementing service continuity of the user.

19 Claims, 8 Drawing Sheets

(58) Field of Classification Search
CPC ......... H04W 28/0252; H04W 28/0268; H04W 28/20; H04W 28/22; H04W 36/0011; H04W 36/0022; H04W 36/0033; H04W 36/0038; H04W 36/0044; H04W 36/0066; H04W 36/00695; H04W 36/14; H04W 36/144; H04W 4/20; H04W 4/50; H04W 4/60; H04W 4/70; H04W 48/18; H04W 60/00; H04W 60/06; H04W 72/29; H04W 72/542; H04W 76/00; H04W 76/10; H04W 76/38; H04W 8/02; H04W 8/22; H04W 8/24; H04W 84/12; H04W 88/14; H04W 92/24; H04M 1/72403; H04M 15/66; H04M 15/8228; H04L 12/14; H04L 12/1407; H04L 12/4633; H04L 41/0661; H04L 43/0817; H04L 61/2592; H04L 61/4511; H04L 63/0281; H04L 63/08; H04L 63/0892; H04L 63/10; H04L 63/162; H04L 67/10; H04L 67/14; H04L 69/40; G06F 11/0709; G06F 11/079; G06F 11/20; G06F 11/2025; G06F 11/30; G06F 11/3051

See application file for complete search history.

(56) References Cited

U.S. PATENT DOCUMENTS

| | | | |
|---|---|---|---|
| 11,627,641 B2* | 4/2023 | Ali | H04W 92/045 370/401 |
| 2007/0204155 A1 | 8/2007 | Dutta et al. | |
| 2015/0043353 A1* | 2/2015 | Javed | H04W 24/08 370/241 |
| 2015/0078173 A1* | 3/2015 | Javed | H04W 36/12 370/241 |
| 2015/0163617 A1* | 6/2015 | Hall | H04W 4/50 455/414.1 |
| 2016/0119347 A1* | 4/2016 | Liu | H04W 8/24 370/331 |
| 2016/0277926 A1* | 9/2016 | Molina | H04W 12/06 |
| 2016/0360441 A1* | 12/2016 | Shi | H04W 28/04 |
| 2017/0104758 A1* | 4/2017 | Jin | H04W 12/069 |
| 2017/0142611 A1* | 5/2017 | Andgart | H04W 28/24 |
| 2018/0220339 A1 | 8/2018 | Arora et al. | |
| 2018/0309660 A1 | 10/2018 | Loehr et al. | |
| 2018/0376384 A1* | 12/2018 | Youn | H04W 36/144 |
| 2019/0021121 A1* | 1/2019 | Aravamudhan | H04W 28/22 |
| 2019/0029065 A1 | 1/2019 | Park et al. | |
| 2019/0124561 A1 | 4/2019 | Faccin et al. | |
| 2019/0182718 A1 | 6/2019 | Shan | |
| 2019/0357129 A1 | 11/2019 | Park et al. | |
| 2020/0252849 A1 | 8/2020 | Tang | |
| 2020/0329420 A1* | 10/2020 | Ishikawa | H04W 88/16 |

FOREIGN PATENT DOCUMENTS

| | | | | |
|---|---|---|---|---|
| CN | 108282827 A | 7/2018 | | |
| CN | 108347748 A | 7/2018 | | |
| CN | 108632917 A | 10/2018 | | |
| CN | 108966300 A | 12/2018 | | |
| CN | 109040327 A | 12/2018 | | |
| CN | 109041149 A | 12/2018 | | |
| CN | 109246767 A | 1/2019 | | |
| EP | 3383094 A1 | 10/2018 | | |
| EP | 3745811 A1 * | 12/2020 | ............ | H04W 76/16 |
| WO | WO-2016165307 A1 * | 10/2016 | | |
| WO | 2018093168 A1 | 5/2018 | | |
| WO | 2018128529 A1 | 7/2018 | | |
| WO | 2018231028 A1 | 12/2018 | | |
| WO | 2019075741 A1 | 4/2019 | | |

OTHER PUBLICATIONS

3GPP TS 23.060 V16.0.0, Mar. 2019, "3rd Generation Partnership Project; Technical Specification Group Services and System Aspects; General Packet Radio Service (GPRS); Service description; Stage 2 (Release 16)," 367 pages.

3GPP TS 23.502 V16.1.1, Jun. 2019, "3rd Generation Partnership Project; Technical Specification Group Services and System Aspects; Procedures for the 5G System; Stage 2 (Release 16)," 494 pages.

Ericsson, "[E201] Handling of mapped Gummei at idle mode mobility from 5GS to EPS," 3GPP TSG-RAN WG2 #103 Tdoc R2-1811160, Gothenburg, Sweden, Aug. 20-24, 2018, 3 pages.

Yang Bin, "Research on the Spatial Spectrum and Energy Efficiency of 5G Ultra-dense Small Cell Networks," Huazhong University of Science and Technology, May 2018, with an English abstract, 160 pages.

NEC, "Mobility between NR and legacy systems," 3GPP TSG-RAN #78, RP-172780, Lisbon, Portugal, Dec. 18-21, 2017, 5 pages.

Huawei et al., "5G AKA, discussion of options 1 and 2," 3GPP TSG SA WG3 (Security) Meeting #88Bis Adhoc S3-172478, Oct. 9-13, 2017, Singapore, 8 pages.

Huawei et al., "Discussion on security of interworking with N26," 3GPP TSG SA WG3 (Security) Meeting #89 63-173232, Nov. 27-Dec. 1, 2017, Reno, USA, 3 pages.

Nokia, et al., 23. 502: OI#13—5GS Registration procedure at mobility between EPS and 5GS with existing 5GC non-3GPP PDU session, 3GPP TSG SA WG2#124 S2-178430, Nov. 27-Dec. 1, 2017, 19 pages.

Samsung, TS 23. 502: Session Release after inter-system mobility, 3GPP TSG SA WG2#124 S2-178777, Nov. 27-Dec. 1, 2017, 8 pages.

Ericsson, Handling of Notify Request in EPC, 3GPP TSG SA WG2#129, S2-1810266, Oct. 15-19, 2018, 11 pages.

S2-177537, Qualcomm Incorporated, "OI#5: Handling mobility scenarios for SR mode UEs between 2G/3G and NR/E-UTRAN connected to 5GC," SA WG2 Meeting #123, Oct. 23-27, 2017, Ljubljana, Slovenia, 4 pages.

3GPP TS 23.401 V16.3.0 "3rd Generation Partnership Project; Technical Specification Group Services and System Aspects; General Packet Radio Service (GPRS) enhancements for Evolved Universal Terrestrial Radio Access Network (E-UTRAN) access (Release 16)," 423 pages.

S2-179051, Intel, et al., "Mobility between 5GS and GERAN/UTRAN," SA WG2 Meeting #S2-124, Nov. 27-Dec. 1, 2017, Reno, Nevada, USA, 6 pages.

* cited by examiner

SERVICE CONTINUITY IMPLEMENTATION METHOD, RELATED APPARATUS, AND SYSTEM

CROSS-REFERENCE TO RELATED APPLICATIONS

This is a continuation of International Patent Application No. PCT/CN2020/097539, filed on Jun. 22, 2020, which claims priority to Chinese Patent Application No. 201910649087.8, filed on Jul. 18, 2019. The disclosures of the aforementioned applications are hereby incorporated by reference in their entireties.

TECHNICAL FIELD

This application relates to the field of communication technologies, and in particular, to a service continuity implementation method, a related apparatus, and a system.

BACKGROUND

In existing mobile communication networks, a 2nd generation (2G) network or a 3rd generation (3G) network (which may also be referred to as a 2/3G network) and a 4th generation (4G) network has wider coverage than a 5th generation (5G) network. Therefore, when a user equipment moves, the user equipment may first access the 2/3G network, then move to the 4G network, and finally move to the 5G network. Alternatively, after accessing the 2/3G network, a user equipment directly moves to the 5G network.

A conventional technology provides a method for implementing service continuity when user equipment moves between a 5G network and a 4G network. However, if the user equipment moves from a 2/3G network to the 5G network after accessing the 2/3G network, the UE needs to re-access the 5G network. As a result, services used by users in the 2/3G network are interrupted and service continuity cannot be maintained.

SUMMARY

Embodiments of this application provide a service continuity implementation method, to resolve a service interruption problem in a conventional technology that is caused by movement of user equipment from a 2/3G network to a 5G network.

According to a first aspect, an embodiment of this application provides a service continuity implementation method. The method is applied to a serving node device in a communication network, and includes the following steps.

When a user equipment is attached to a 2/3G network, the serving node device determines that the user equipment has a 5G capability or a user corresponding to the user equipment is a 5G user. Then, the serving node device selects a 5G gateway for the user equipment, and establishes a session with the 5G gateway. In this way, when the user equipment subsequently moves to a 5G network, the same 5G gateway serves the user equipment, and an address of the user may remain unchanged when the user equipment moves from the 2/3G network to the 5G network. This implements service continuity of the user.

In an optional implementation, the serving node device may determine, in the following manner, that the user corresponding to the user equipment is the 5G user.

The serving node device receives an attach request sent by the user equipment, where the attach request carries a user identifier, and the attach request is used to request to be attached to the 2/3G network. Subsequently, the serving node device obtains, from a user database server based on the user identifier, subscription data of the user corresponding to the user equipment, and determines, based on the obtained subscription data, that the user corresponding to the user equipment is the 5G user.

In an optional implementation, the serving node device may determine that the user equipment has the 5G capability and the user is the 5G user, and then the serving node device selects the 5G gateway for the user equipment.

In an optional implementation, the serving node device receives an attach request sent by the user equipment, where the attach request carries the 5G capability of the user equipment. Therefore, the serving node device may determine, based on the received attach request, that the user equipment has the 5G capability.

In an optional implementation, that the serving node device establishes a session with the 5G gateway includes the following.

The serving node device sends a create packet data protocol (PDP) session request to the 5G gateway, and receives a create PDP session response message returned by the 5G gateway.

In an optional implementation, the create PDP session response message received by the serving node device carries a 2/3G network parameter of the user equipment, and the serving node device further sends the 2/3G network parameter to the user equipment, such that the UE uses the 2/3G network.

In an optional implementation, after receiving a tracking area update request sent by the user equipment, a mobility management device further obtains a 5G network parameter of the user equipment from the 5G gateway, and then sends the 5G network parameter to the user equipment using a tracking area update response. As such, the user equipment uses the 5G network parameter after moving to the 5G network.

In an optional implementation, the tracking area update request received by the mobility management device further carries a correspondence between a packet data unit (PDU) session identifier and an evolved packet system (EPS) bearer identifier, where a PDU session is used by the user equipment after the user equipment moves to 5G network, and an EPS bearer is used by the user equipment in a 4G network. The mobility management device sends the correspondence between a PDU session identifier and an EPS bearer identifier to the 5G gateway using a create session request message. The 5G gateway may receive the create session request message, and store the correspondence that is between a PDU session identifier and an EPS bearer identifier and that is carried in the create session request message.

Subsequently, the mobility management device receives a create session response message returned by the 5G gateway, where the create session response message carries the 5G network parameter. The mobility management device may send the 5G network parameter to the user equipment using the tracking area update response, such that the user equipment uses the 5G network parameter after moving to the 5G network.

In an optional implementation, after the user equipment moves to the 5G network, the 5G gateway may find a PDU session of the user equipment using the correspondence between a PDU session identifier and an EPS bearer identifier, and apply the 5G network parameter to the PDU session.

In an optional implementation, the serving node device receives a bearer allocation request sent by the user equipment, and then obtains a 5G network parameter of the user equipment from the 5G gateway. After obtaining the 5G network parameter, the serving node device sends the 5G network parameter to the user equipment using a bearer allocation response.

In an optional implementation, the bearer allocation response may be a modify bearer request message.

In an optional implementation, the bearer allocation request sent by the user equipment further carries a correspondence between a PDU session identifier and an EPS bearer identifier. The mobility management device sends the correspondence between a PDU session identifier and an EPS bearer identifier to the 5G gateway using a bearer resource command request, and then receives a bearer resource response sent by the 5G gateway, where the bearer resource response carries the 5G network parameter. The mobility management device sends the 5G network parameter to the user equipment using the modify bearer request message.

In an optional implementation, the mobility management device receives the 5G network parameter of the user that is sent by the 5G gateway, and then sends the 5G network parameter to the user equipment.

In an optional implementation, the mobility management device receives a modify bearer request sent by the user equipment, where the modify bearer request carries a correspondence between a PDU session identifier and an EPS bearer identifier. Then, the mobility management device sends the correspondence between a PDU session identifier and an EPS bearer identifier to the 5G gateway, such that the 5G gateway stores the correspondence between a PDU session identifier and an EPS bearer identifier.

In an optional implementation, the serving node device receives an activate context request message sent by the user equipment, where the activate context request message carries a PDU session identifier.

In this case, that the serving node device establishes a session with the 5G gateway includes the following.

The serving node device sends a create PDP context request message to the 5G gateway, where the create PDP context request message is used to request to create a PDP context for the user equipment, and the create PDP context request message carries the PDU session identifier.

The serving node device receives a create PDP context response message sent by the 5G gateway.

In an optional implementation, the create PDP context response message received by the serving node device further carries a 5G network parameter allocated to the user equipment. Then, the serving node device sends an activate context response message to the user equipment, where the activate context response message carries the 5G network parameter.

In an optional implementation, that the serving node device selects a 5G gateway for the user equipment includes the following.

The serving node device generates a fully qualified domain name (FQDN) of the 5G gateway, or obtains an FQDN of the 5G gateway from a domain name system; and then obtains an address of the 5G gateway from the domain name system using the FQDN.

In an optional implementation, the serving node device obtains a 5G network parameter of the user from the 5G gateway, and then sends the 5G network parameter to the user equipment.

According to a second aspect, an embodiment of this application provides a service continuity implementation method. The method includes the following.

A 5G gateway receives a create session request sent by a mobility management device or a serving node device, where the create session request carries indication information indicating that user equipment has a 5G capability or a user has subscribed to a 5G service. Then, the 5G gateway allocates a 5G network parameter to a user corresponding to the user equipment or to the user, and sends the allocated 5G network parameter to the mobility management device or the serving node device. Therefore, the mobility management device or the serving node device may forward the 5G network parameter to the user equipment, and the user equipment may store the 5G network parameter, and use the 5G network parameter after moving to a 5G network, to implement service continuity.

In an optional implementation, when the user equipment accesses a 4G network, the 5G gateway may receive the create session request sent by the mobility management device. When the user equipment accesses a 2/3G network, the 5G gateway may receive the create session request sent by the serving node device. Therefore, the 5G gateway may allocate the 5G parameter to the user equipment before the user equipment accesses the 5G network, such that the user equipment directly uses the 5G network parameter after accessing the 5G network, to implement the service continuity.

In an optional implementation, the 5G gateway sends the allocated 5G network parameter to the mobility management device using a create session response message or an update bearer request message.

In an optional implementation, the 5G gateway sends the allocated 5G network parameter to the serving node device using a create session response message.

In an optional implementation, the 5G gateway receives a correspondence that is between a PDU session identifier and a bearer identifier and that is sent by the mobility management device or the serving node device. Then, the 5G gateway determines, based on the correspondence, a PDU session corresponding to the user equipment, and applies the 5G network parameter to the PDU session.

In an optional implementation, the bearer identifier includes an EPS bearer identifier or a PDP context identifier.

In an optional implementation, the 5G gateway allocates a 2/3G network parameter and a 4G network parameter that correspond to the 5G network parameter to the user. In this way, in addition to sending the 5G parameter to the mobility management device or the serving node device, the 5G gateway further sends the 2/3G network parameter and the 4G network parameter to the mobility management device or the serving node device, such that the user equipment enjoys a similar service in 2/3G, 4G, and 5G.

According to a third aspect, an embodiment of this application provides a service continuity implementation method. The method includes the following.

When accessing a 2/3G network, user equipment sends an activate PDP context request message to a serving node device to activate a PDP context, where the activate PDP context request message carries indication information indicating that the user equipment has a 5G capability. Then, the user equipment receives an activate PDP context response message sent by the serving node device, where the activate PDP context request response carries a 5G network parameter.

According to a fourth aspect, an embodiment of this application provides a service continuity implementation method. The method includes the following.

User equipment sends a tracking area update request message to a mobility management device to perform tracking area update, where the tracking area update request message carries indication information indicating that the user equipment has a 5G capability. Then, the user equipment receives a tracking area update response message sent by the mobility management device, where the tracking area update response message carries a 5G network parameter.

In an optional implementation, the tracking area update response message further carries a 2/3G network parameter and a 4G network parameter that correspond to the 5G network parameter.

According to a fifth aspect, an embodiment of this application provides a service continuity implementation method. The method includes the following.

User equipment sends a bearer resource allocation request message to a mobility management device to request to allocate a bearer resource, where the bearer resource allocation request message carries indication information indicating that the user equipment has a 5G capability. Then, the user equipment receives a bearer resource allocation response message sent by the mobility management device, where the bearer resource allocation response message carries a 5G network parameter.

In an optional implementation, the bearer resource allocation response message further carries a 2/3G network parameter and a 4G network parameter that correspond to the 5G network parameter.

According to a sixth aspect, an embodiment of this application provides a service continuity implementation method. The method includes the following.

User equipment sends an activate PDP context request to a mobility management device, where the activate PDP context request carries indication information indicating that the user equipment has a 5G capability. Then, the user equipment receives an activate PDP context response sent by the mobility management device, where the activate PDP context response carries a 5G network parameter.

In an optional implementation, the activate PDP context response message received by the user equipment further carries a 2/3G network parameter and a 4G network parameter that correspond to the 5G network parameter.

According to a seventh aspect, an embodiment of this application provides a service continuity implementation method. The method includes the following.

User equipment receives a modify bearer context request message sent by a mobility management device, where the modify bearer context request message carries a 5G network parameter. Then, the user equipment stores the 5G network parameter.

In an optional implementation, the user equipment sends a modify bearer context accept message to the mobility management device, where the modify bearer context accept message carries a correspondence between a PDU session identifier and an EPS bearer identifier.

In the solutions provided in the third aspect to the seventh aspect, the user equipment may store the 5G network parameter, and directly use the 5G network parameter when subsequently moving to the 5G network, to maintain the service continuity.

In the solutions provided in the third aspect to the seventh aspect, the indication information indicating that the user equipment has the 5G capability is at least one of the PDU session identifier, the correspondence between a PDU session identifier and an EPS bearer identifier, and a correspondence between a PDU session identifier and a PDP context identifier.

In the solutions provided in the third aspect to the seventh aspect, when moving from the 2/3G network to the 5G network, the user equipment performs a data service using the 5G network parameter.

In the solutions provided in the third aspect to the seventh aspect, the 5G network parameter includes quality of service and a traffic flow template.

According to an eighth aspect, an embodiment of this application provides a service continuity implementation method. The method includes the following.

User equipment sends a PDU session establishment request to an access management function (AMF), to establish a PDU session.

The user equipment receives a PDU session establishment complete message sent by the AMF, where the PDU session establishment complete message carries a 5G network parameter, and a 2/3G network parameter and a 4G network parameter that correspond to the 5G network parameter.

The user equipment may be configured to: store the 2/3G network parameter and the 4G network parameter; and when subsequently moving to a 2/3G network or a 4G network, directly use the 2/3G network parameter and the 4G network parameter without obtaining these parameters from a core network device. This further improves service continuity.

According to a ninth aspect, an embodiment of this application provides a serving node device, including: a non-volatile memory and a processor that are coupled to each other, where the processor invokes program code stored in the memory, to enable the serving node device to perform the method according to the first aspect.

According to a tenth aspect, an embodiment of this application provides a 5G gateway, including: a non-volatile memory and a processor that are coupled to each other, where the processor invokes program code stored in the memory, to enable the 5G gateway to perform the method according to the second aspect.

According to an eleventh aspect, an embodiment of this application provides a serving node device, including: a determining module configured such that when a user equipment is attached to a 2/3G network, the determining module determines that the user equipment has a 5G capability or a user corresponding to the user equipment is a 5G user; a selection module configured to select a 5G gateway for the user equipment; and a session establishment module configured to establish a session with the 5G gateway.

The serving node device provided in this embodiment may be used in the service continuity implementation method provided in the first aspect, to implement service continuity of the user equipment through collaboration among the determining module, the selection module, and the session establishment module, and resolve a service interruption problem in a conventional technology that is caused by movement of the user equipment from the 2/3G network to a 5G network.

In an optional implementation, that the determining module in the serving node device determines that the user corresponding to the user equipment is the 5G user includes: receiving an attach request sent by the user equipment, where the attach request carries a user identifier; obtaining, from a user database server based on the user identifier, subscription data of the user corresponding to the user equipment; and then determining, based on the subscription data, that the user is the 5G user.

In an optional implementation, the serving node device further includes a receiving module configured to receive an attach request sent by the user equipment, where the attach request carries the 5G capability of the user equipment. In this case, the receiving module further determines, based on the received attach request, that the user equipment has the 5G capability.

In an optional implementation, that the session establishment module in the serving node device establishes the session with the 5G gateway includes: sending a create packet data protocol (PDP) session request to the 5G gateway, and receiving a create PDP session response message returned by the 5G gateway.

In an optional implementation, the serving node device further includes: an obtaining module configured to obtain a 5G network parameter of the user equipment from the 5G gateway after a bearer allocation request sent by the user equipment is received; and a sending module configured to send the 5G network parameter to the user equipment using a bearer allocation response, such that the user equipment may receive the bearer allocation response, and store the 5G network parameter carried in the bearer allocation response, to directly use the 5G parameter after subsequently moving to a 5G network.

In an optional implementation, the receiving module in the serving node device is further configured to receive an activate context request message sent by the user equipment, where the activate context request message carries a PDU session identifier.

That the session establishment module in the serving node device establishes the session with the 5G gateway includes: sending a create PDP context request message to the 5G gateway, where the create PDP context request message is used to request to create a PDP context for the user equipment, and the create PDP context request message carries the PDU session identifier; and receiving a create PDP context response message sent by the 5G gateway, to create the session between the serving node device and the 5G gateway.

The create PDP context response carries a 5G network parameter allocated to the user equipment. The sending module in the serving node device is further configured to send an activate context response message to the user equipment, where the activate context response message carries the 5G network parameter.

In an optional implementation, that the selection module in the serving node device provided in this application selects the 5G gateway for the user equipment includes: generating a FQDN of the 5G gateway, or obtaining a FQDN of the 5G gateway from a domain name system; and requesting, using the FQDN, the domain name system to perform address resolution to obtain an address of the 5G gateway.

According to a twelfth aspect, an embodiment of this application provides a 5G gateway, including a receiving module, a parameter allocation module, and a sending module.

The receiving module is configured to receive a create session request sent by a mobility management device or a serving node device, where the create session request carries indication information indicating that user equipment has a 5G capability or a user has subscribed to a 5G service.

The parameter allocation module is configured to allocate a 5G network parameter to a user corresponding to the user equipment or to the user.

The sending module is configured to send the allocated 5G network parameter to the mobility management device or the serving node device.

The 5G gateway provided in this embodiment may be used in the service continuity implementation method provided in the foregoing embodiments, to implement service continuity of the user equipment through collaboration among the receiving module, the parameter allocation module, and the sending module, and resolve a service interruption problem in a conventional technology that is caused by movement of the user equipment from a 2/3G network to a 5G network.

In an optional implementation, the sending module in the 5G gateway may send the allocated 5G network parameter to the mobility management device using a create session response message or an update bearer request message. In addition, the sending module may further send the allocated 5G network parameter to the serving node device using the create session response message, such that the serving node device or the mobility management device forwards the 5G network parameter to the user equipment. In this way, the user equipment may use the 5G network parameter after moving to the 5G network.

In an optional implementation, the receiving module in the 5G gateway is further configured to receive a correspondence that is between a PDU session identifier and a bearer identifier and that is sent by the mobility management device or the serving node device. In this case, the 5G gateway further includes a parameter application module configured to determine, based on the correspondence, a PDU session corresponding to the user equipment, and then apply the 5G network parameter to the PDU session.

In an optional implementation, the parameter allocation module in the 5G gateway is further configured to allocate a 2/3G network parameter and a 4G network parameter that correspond to the 5G network parameter to the user. In this case, the sending module in the 5G gateway is further configured to send the 2/3G network parameter and the 4G network parameter to the mobility management device or the serving node device. Therefore, the user equipment may store the 2/3G network parameter, the 4G network parameter, and the 5G network parameter for subsequent use.

According to a thirteenth aspect, an embodiment of this application provides a communication system, including: a serving node device and a 5G gateway, where the serving node device is configured to: when user equipment is attached to a 2/3G network, determine that the user equipment has a 5G capability or a user corresponding to the user equipment is a 5G user; and select, by the serving node device, the 5G gateway for the user equipment, and establish a session with the 5G gateway; and the 5G gateway is configured to establish the session with the serving node device.

In an optional implementation, the 5G gateway in the communication system is further configured to: receive a create session request sent by a mobility management device or the serving node device, where the create session request carries indication information indicating that the user equipment has the 5G capability or the user is the 5G user; allocate a 5G network parameter to the user; and send the allocated 5G network parameter to the mobility management device or the serving node device.

In an optional implementation, the communication system may further include the mobility management device. The mobility management device is configured to receive the 5G network parameter of the user that is sent by the 5G gateway, and then send the 5G network parameter to the user equipment.

In an optional implementation, the serving node device and the mobility management device may be further configured to perform the method according to the first aspect, and the 5G gateway may be configured to perform the method according to the second aspect. For details, refer to the first aspect and the second aspect.

In an optional implementation, the communication system may further include the user equipment, a user database server, and the like.

According to a fourteenth aspect, an embodiment of this application provides a computer-readable storage medium. The computer-readable storage medium stores program code, where the program code includes instructions used to perform a part or all of steps of any method according to the first aspect to the eighth aspect.

According to a fifteenth aspect, an embodiment of this application provides a computer program product. When the computer program product runs on a computer, the computer is enabled to perform a part or all of steps of any method according to the first aspect to the eighth aspect.

In the embodiment described in any one of the foregoing aspects, the user identifier may be a globally unique temporary identity, an international mobile subscriber identity, a mobile station international subscriber direction number (ISDN) number, an Internet Protocol (IP) multimedia private identity, an IP multimedia public identity, or an international mobile device identity of the user.

In the embodiment described in any one of the foregoing aspects, the 5G gateway is a device that integrates a 2/3G gateway, a 4G gateway, and a 5G gateway.

In the embodiment described in any one of the foregoing aspects, the 5G gateway is a session management function device.

In the embodiment described in any one of the foregoing aspects, the serving node device is a serving general packet radio service support node device, and the mobility management device is a mobility management entity.

BRIEF DESCRIPTION OF DRAWINGS

To describe technical solutions in embodiments or the background of this application more clearly, the following describes the accompanying drawings used in the embodiments or the background of this application.

DESCRIPTION OF EMBODIMENTS

The following describes embodiments of this application in detail with reference to accompanying drawings in the embodiments of this application.

Figure 1:
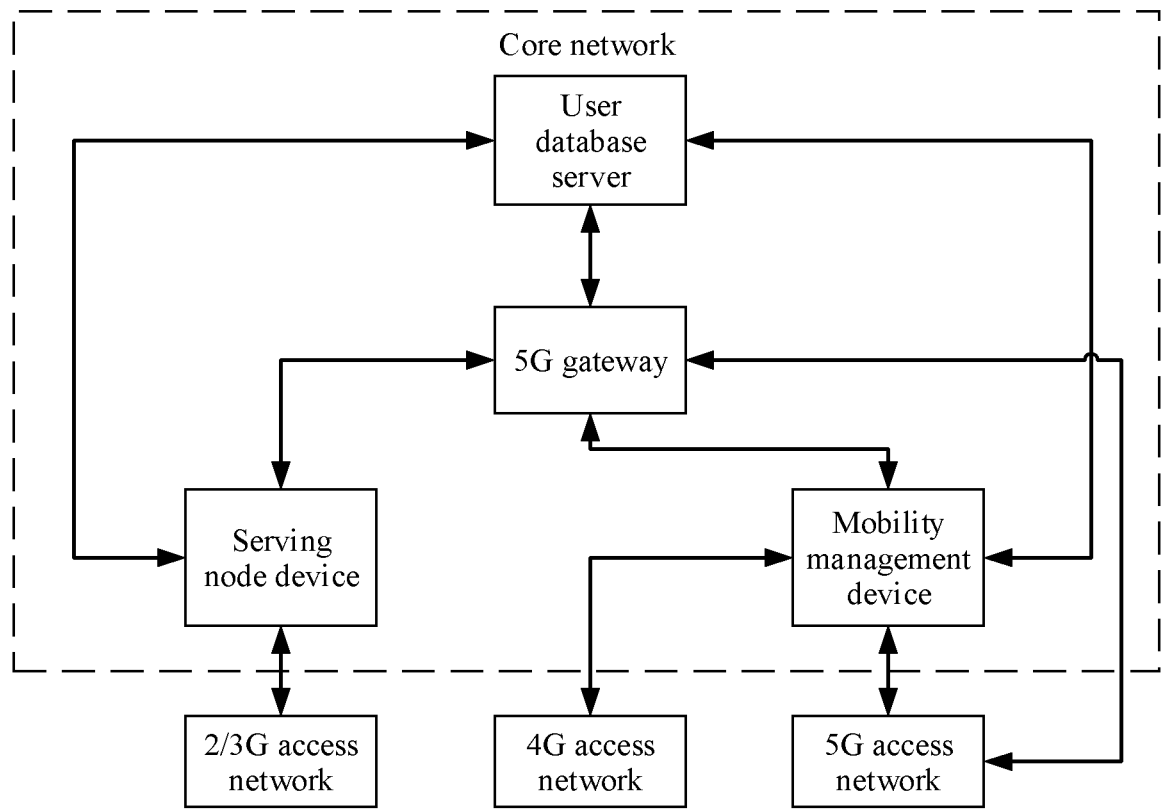
FIG. 1 is a schematic diagram of a communication system according to an embodiment of this application.
Figure 1:
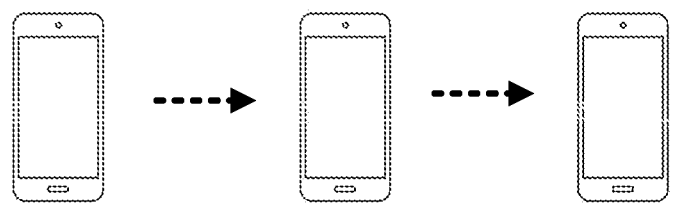

FIG. 1 is a schematic diagram of a communication system according to an embodiment of this application.

The communication system provided in this embodiment of this application includes a 2/3G access network device, a 4G access network device, a 5G access network device, and a core network device. The access network device may include a base station or the like. The core network device may include a user database server, a serving node device, a 5G gateway, and a mobility management device.

A 2/3G access network accesses a core network through the serving node device, a 4G access network accesses the core network through the mobility management device, and a 5G access network may access the core network through the mobility management device or the 5G gateway. Therefore, a user equipment (UE) may access the core network through the 2/3G access network device, the 4G access network device, or the 5G access network device.

A 2G network may include a global system for mobile communications (global system for mobile communication, GSM) network and a code-division multiple access (CDMA) network. A 3G network may include a wideband code-division multiple access (WCDMA) network, a CDMA2000 network, and a time division-synchronous code division multiple access (TD-SCDMA) network. A 4G network includes a Long-Term Evolution (LTE) network. A 5G network includes a new radio (NR) network, and the like. In addition, for ease of description, the 2/3G access network in the embodiments is referred to as a 2/3G network for short, the 4G access network is referred to as a 4G network for short, and the 5G access network is referred to as a 5G network for short.

The serving node device may be a serving General Packet Radio Service (GPRS) support node (SGSN), and is mainly used for mobility management of UEs in the 2G and 3G networks. A gateway GPRS support node (GGSN) is mainly used for session management and UE data forwarding in the 2G and 3G networks. The SGSN may be deployed independently, or may be deployed together with the GGSN.

The mobility management device may also be referred to as a mobility management entity (MME), and is mainly responsible for a positioning process, a paging process, and the like of UE in an idle mode in the 4G network.

In this embodiment, the 5G gateway includes a session management function (SMF) device, which may implement session management on a UE accessing the 5G network.

The 5G gateway may alternatively be a converged gateway that integrates functions of the GGSN, a serving gateway (SGW), a packet data network (PDN) gateway (PGW), and the SMF (which may be referred to as a converged 5G gateway). If a control plane and a user plane are separately deployed, the 5G gateway in this embodiment may be a device that integrates control plane functions of the SMF and the GGSN, a control plane function of the SGW, and a control plane function of the PGW.

The user database server may store subscription data of a user, and may be a device that integrates functions of a unified data management (UDM) device, a home subscriber server (HSS), and a home location register (HLR), or may be a device that has independent functions of the UDM, the HSS, and the HLR.

The UE supports access to the 2/3G, 4G, and 5G networks, and can move freely among the 2/3G, 4G, and 5G networks.

In the communication system provided in this embodiment, the UE supporting the 5G access network first accesses the 2/3G access network, and the UE initiates an attach request to the 2/3G network. After receiving the attach request of the UE, the SGSN determines whether the user equipment has a 5G capability or whether a user corresponding to the UE has subscribed to a 5G service. If the user equipment has the 5G capability or the user has subscribed to the 5G service, the SGSN selects a 5G gateway for the user equipment, and then establishes a session with the 5G gateway. When the UE in this embodiment is attached to the 2/3G network, the SGSN may select the 5G gateway for the UE, and the 5G gateway serves the UE. This cannot be implemented in a conventional technology. Therefore, when the UE subsequently moves from the 2/3G network to the 5G network, the 5G gateway still serves the UE, such that a data service (for example, a video call or an online video) of the user in the 2/3G network continues to be maintained in the 5G network, to improve service experience of the user.

To understand the embodiments of this application in detail, the following provides a detailed method procedure to describe a service continuity implementation method provided in this application.

Figure 2:
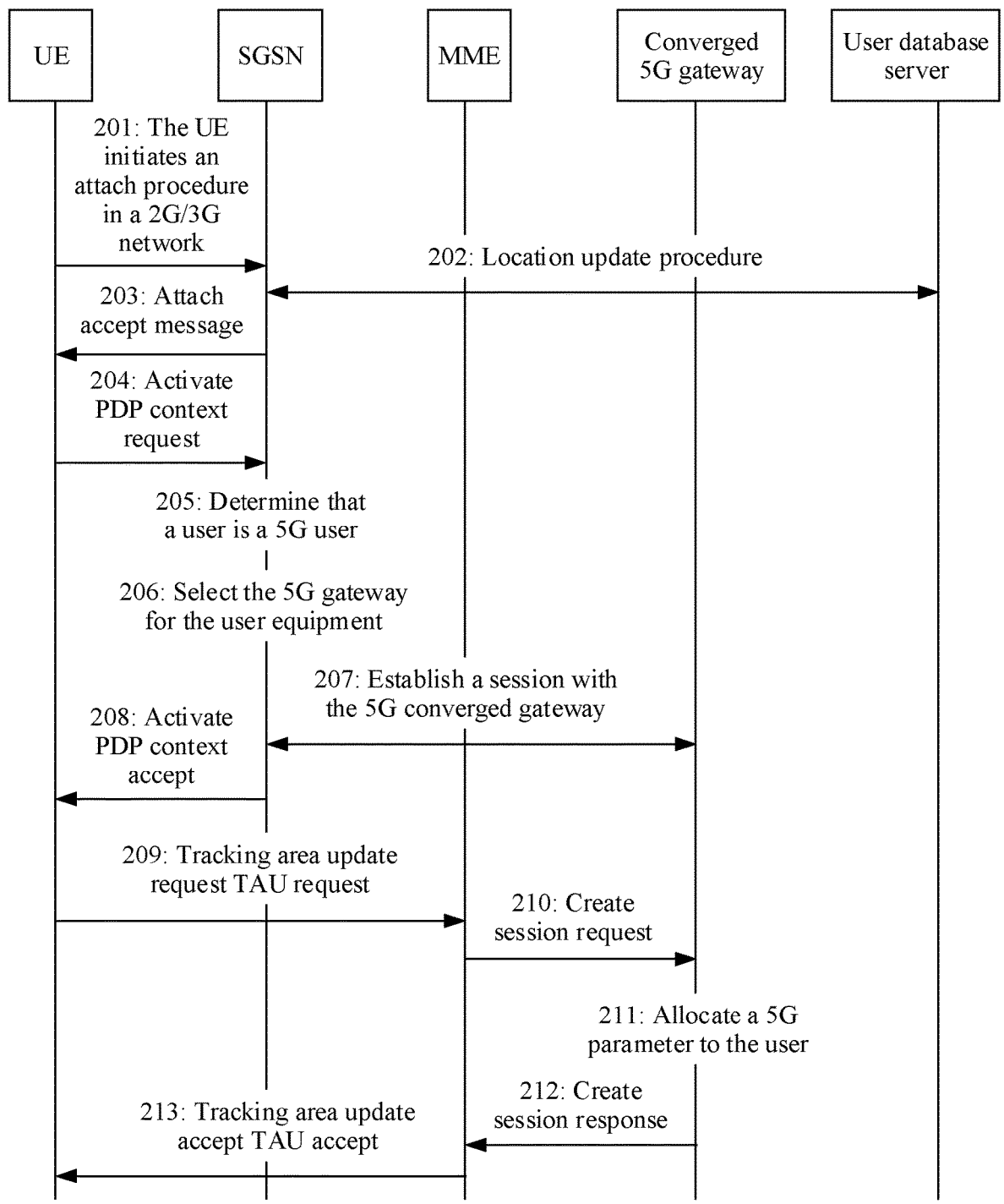
FIG. 2 is a flowchart of a service continuity implementation method according to an embodiment of this application.

FIG. 2 is a flowchart of a service continuity implementation method according to an embodiment of this application.

The method provided in this embodiment includes the following steps.

Step 201: 5G user equipment accesses a 2/3G network, and sends an attach request to the 2/3G network.

In this embodiment, the UE that supports 2/3G, 4G, and 5G access first accesses the 2/3G network, for example, when a user is in an elevator or a garage. When accessing the 2/3G network, the UE sends the attach request to a 2/3G network device. The attach request is forwarded to an SGSN through a 2/3G radio access network.

The attach request may carry a user identifier and a 5G capability of the UE. In addition, the attach request may further carry location information of the UE.

The 5G capability of the UE may be carried using a UE Network Capability parameter or an MS Network Capability parameter in the attach request. For example, if a value of the parameter is N1 mode support, it indicates that the UE has the 5G capability, in other words, the UE supports access to a 5G network.

Step 202: The SGSN initiates location update to a user database server.

After receiving the attach request of the UE, the SGSN initiates the location update to the user database server.

The SGSN may send a location update request message to the user database server, where the location update request message carries the user identifier. The user identifier may be a globally unique temporary identity (GUTI), an international mobile subscriber identity, a mobile station subscriber ISDN number, an international mobile device identity, or the like.

The user database server records a location of the UE, obtains subscription data of the user based on the user identifier, and then sends a location update response message to the SGSN, where the response message carries the subscription data of the user. For example, 5G subscription information carried in the subscription data includes: a capability of not being allowed to enter a 5G core network (e.g., a Core Network Restriction parameter) and a capability of being allowed to switch a bearer to 5G (e.g., an Interworking 5G system (5GS) Indicator parameter).

Step 203: The SGSN sends an attach accept message to the UE.

After completing the location update of the UE, the SGSN may send the attach accept message to the UE.

Step 204: The UE sends an activate PDP context request message to the SGSN.

The activate PDP context request message is used to request the SGSN to activate a PDP context of the UE.

Step 205: The SGSN determines that the user corresponding to the UE is a 5G user.

In this embodiment, the subscription data carries information indicating that the user has subscribed to a 5G service. Therefore, the SGSN may determine that the user corresponding to the UE is the 5G user. If the subscription data does not carry information about the 5G service, that is, the UE has not subscribed to the 5G service, an SGSN determines that the user is a non-5G user, and performs a normal PDP context activation procedure.

Step 206: The SGSN selects a 5G gateway for the user equipment.

In this embodiment, the SGSN may generate a fully qualified domain name (FQDN) of the 5G gateway based on a routing area identity (RAI) FQDN, and then query a Domain Name System (DNS) using the FQDN of the 5G gateway to obtain an address of the 5G gateway.

In addition, the SGSN may alternatively query the DNS by directly using the RAI FQDN to obtain a DNS resolution result for the gateway, select a domain name corresponding to the 5G gateway based on the resolution result, and then query the DNS using the domain name corresponding to the 5G gateway to obtain the address of the 5G gateway. The 5G gateway and a non-5G gateway are distinguished in the resolution result returned by the DNS. For example, the resolution result for the 5G gateway carries a capability identifier "nc-smf".

In this embodiment, the 5G gateway may be an SMF device, or may be a device that integrates control plane functions of an SMF and a GGSN, a control plane function of an SGW, and a control plane function of a PGW. Alternatively, the 5G gateway may be a converged gateway that integrates functions of a GGSN, an SGW, a PGW, and an SMF.

In another optional embodiment, the SGSN may alternatively select the 5G gateway for the UE when determining that the user corresponding to the UE is the 5G user and the user equipment has the 5G capability.

Step 207: The SGSN establishes a session with the 5G gateway.

The step in which the SGSN establishes the session with the 5G gateway includes: The SGSN sends a create PDP session request to the 5G gateway, and the 5G gateway returns a create PDP session response to the SGSN, where the response may carry a 2/3G network parameter, for example, quality of service (QoS) and an IP address, of the UE.

Step 208: After completing establishment of the session with the 5G gateway, the SGSN returns an activate PDP context accept message to the UE.

The activate PDP context accept message returned by the SGSN to the UE may carry the 2/3G network parameter, for example, the QoS and the IP address, of the UE.

After the UE receives the activate PDP context accept message, a PDP context activation procedure is complete, and the UE may perform a data service using the 2/3G network parameter.

In this embodiment, after the SGSN selects the 5G gateway for the UE, the UE may continue to communicate with the previously selected 5G gateway after subsequently moving to the 5G network, and the address of the UE remains unchanged, to avoid service interruption.

Step 209: The UE sends a tracking area update request to a mobility management entity (MME), to perform a tracking area update procedure.

In this embodiment, the UE moves from the 2/3G network to a 4G network, and initiates the tracking area update (TAU) procedure. The tracking area update request carries parameters such as an identifier of a tracking area in which the UE is located and the 5G capability of the UE.

In addition, the tracking area update request may further carry a correspondence between a PDU session identifier (ID) and an EPS bearer identifier. The correspondence between a PDU session identifier and an EPS bearer ID may be carried in a plurality of manners, for example, may be directly carried using a protocol configuration option (PCO) information element in the TAU request, or may be encapsulated in an ESM Container information element in the TAU request to be sent to the mobility management entity.

After the tracking area update is complete, the UE may continue to use the data service in the 4G network.

Step 210: The MME sends a create session request to the 5G gateway, to create a session with the 5G gateway.

In this embodiment, the create session request sent by the MME carries indication information indicating that the user equipment has the 5G capability or the user has subscribed to the 5G service, to indicate the 5G gateway to allocate a 5G network parameter (or referred to as a 5G parameter for short) to the user corresponding to the user equipment.

For example, if the create session request carries the Interworking 5GS Indicator parameter, it indicates that the user has subscribed to the 5G service. Alternatively, if the create session request carries the UE Network Capability parameter, and the value of the parameter is N1 mode support, it indicates that the user equipment has the 5G capability.

In addition, the create session request may further carry the correspondence between a PDU session identifier and an EPS bearer identifier. After receiving the create session request, the 5G gateway may store the indication information and the correspondence between a PDU session identifier and an EPS bearer identifier.

In addition, the create session request may be transferred to the 5G gateway through the SGW.

Step 211: The 5G gateway allocates the 5G network parameter to the user.

After receiving the create session request sent by the MME, the 5G gateway allocates the 5G network parameter to the user based on the indication information carried in the create session request. For example, parameters such as a 5G QoS rule, a QoS flow description, and a traffic flow template (TFT) are allocated to the user, such that the UE uses the parameters after moving to the 5G network.

Step 212: The 5G gateway sends the 5G network parameter to the MME using a create session response.

Step 213: The MME sends the 5G network parameter to the UE using a tracking area update accept message.

The MME may include the 5G network parameter in a PCO information element in the TAU accept message. Sending of the tracking area update accept message by the MME indicates that the tracking area update procedure ends. After the TAU procedure is complete, the UE may continue to use, in the tracking area, the data service provided in the 4G network.

After receiving the TUA accept message, the UE stores the 5G network parameter carried in the TUA accept message. Subsequently, the UE moves from the 4G network to the 5G network, and the UE may continue to communicate with the 5G gateway. Because the 5G gateway stores the correspondence between a PDU session identifier and an EPS bearer identifier, the 5G gateway can directly find a PDU session used by the UE in the 5G network, and apply the allocated 5G network parameter to the PDU session.

In addition, in this embodiment, because the 5G network parameter has been sent to the UE in advance, after accessing the 5G network, the UE continues to perform the data service by directly using the previously stored 5G network parameter, without re-obtaining the 5G network parameter from the 5G gateway. This further improves service continuity.

Figure 3:
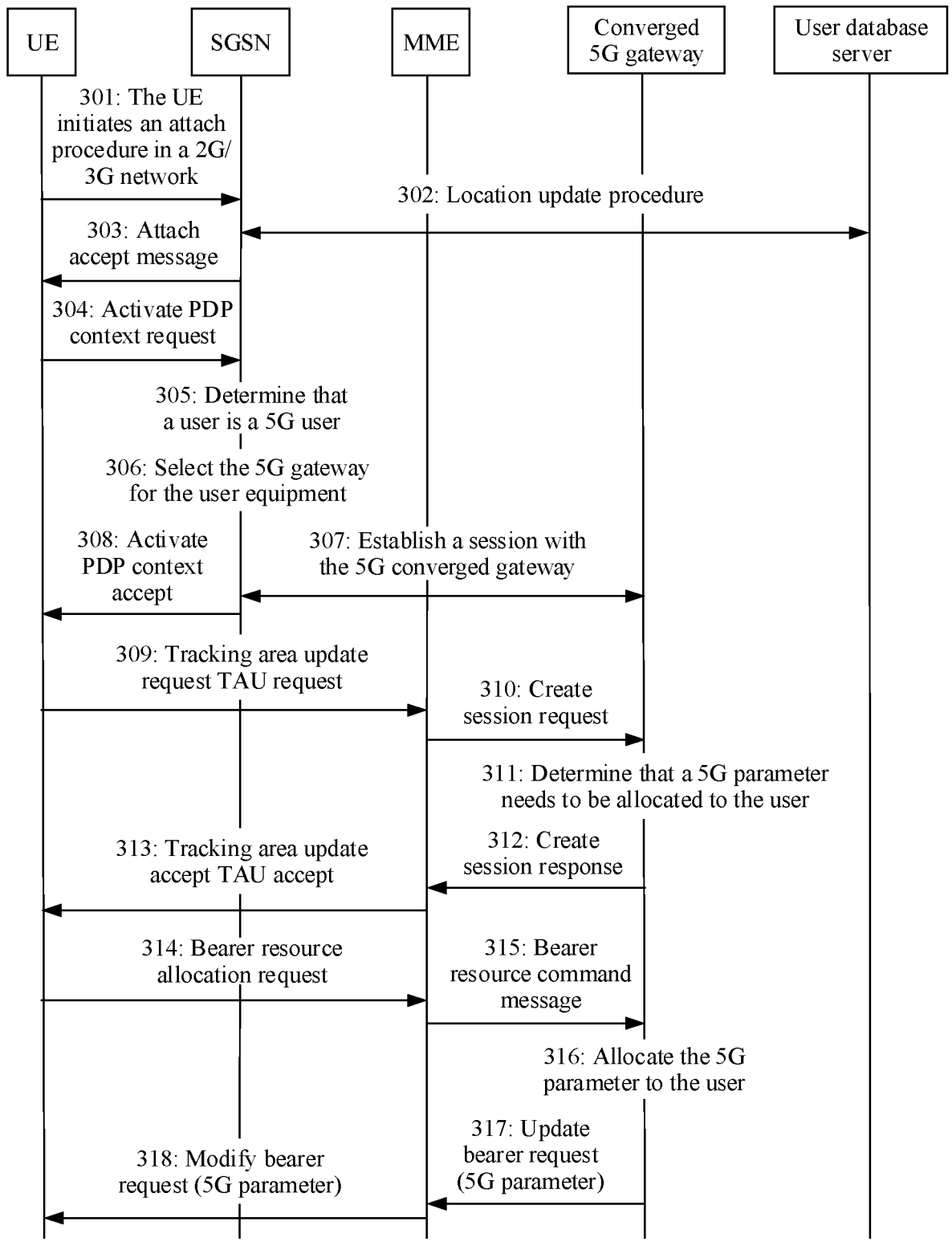
FIG. 3 is a flowchart of another service continuity implementation method according to an embodiment of this application.

FIG. 3 is a flowchart of another method according to an embodiment of this application.

The service continuity implementation method provided in this embodiment includes the following steps.

Step 301: 5G user equipment accesses a 2/3G network, and sends an attach request to the 2/3G network.

Step 302: An SGSN initiates location update to a user database server.

Step 303: The SGSN sends an attach accept message to the UE.

Step 304: The UE sends an activate PDP context request to the SGSN.

Step 305: The SGSN determines that a user corresponding to the UE is a 5G user.

Step 306: The SGSN selects a 5G gateway for the user equipment.

Step 307: The SGSN establishes a session with the 5G gateway.

Step 308: After completing establishment of the session with the 5G gateway, the SGSN returns an activate PDP context accept message to the UE.

Step 309: The UE sends a tracking area update request to an MME, to perform a tracking area update procedure.

An execution process of steps 301 to 309 is the same as that of steps 201 to 209 in the foregoing embodiment. For details, refer to the foregoing embodiment, and the details are not repeated herein.

Step 310: The MME sends a create session request to the 5G gateway, to create a session with the 5G gateway.

In this embodiment, the create session request may carry indication information indicating that the user equipment has a 5G capability or the user has subscribed to a 5G service, to indicate the 5G gateway to allocate a 5G network parameter to the user.

For example, if the create session request carries an Interworking 5GS Indicator parameter, it indicates that the user has subscribed to the 5G service. Alternatively, if the create session request carries a UE Network Capability parameter, and a value of the parameter is N1 mode support, it indicates that the user equipment has the 5G capability.

In addition, the create session request may further carry a correspondence between a PDU session identifier and an EPS bearer identifier.

In this embodiment, the 5G gateway integrates functions of an SMF, a PGW, and an SGW. Internally, the SGW in the 5G gateway receives the create session request sent by the MME, and sends the indication information in the create session request to the SMF using a modify bearer request. The SMF locally stores the indication information, and returns a modify bearer response to the SGW.

Step 311: The 5G gateway determines that the 5G network parameter needs to be allocated to the user.

The SMF in the 5G gateway determines, based on the indication information, that the 5G network parameter needs to be allocated to the user.

In this embodiment, the SMF in the 5G gateway may determine, based on the indication information in the create session request, that the 5G network parameter needs to be allocated to the user. If the create session request sent by the MME does not carry the indication information, the 5G gateway does not need to allocate the 5G network parameter to the user.

Step 312: The 5G gateway sends a create session response to the MME.

In this embodiment, after receiving the modify bearer response returned by the SMF, the SGW in the 5G gateway returns the create session response to the MME, to indicate that a session between the MME and the SGW is created. Because the 5G gateway integrates the function of the SGW, after the SGW returns the create session response, it may also be considered that the session between the MME and the 5G gateway is created.

Step 313: The MME sends a TUA accept message to the UE to complete the TAU procedure.

After the TAU procedure is complete, the UE may continue to use, in a tracking area, a data service provided in a 4G network.

Step 314: The UE sends a bearer resource allocation request to the MME, to request the MME to allocate a bearer resource.

In this embodiment, the bearer resource allocation request sent by the UE may carry the correspondence between a PDU session ID and an EPS bearer ID. The correspondence between a PDU session identifier and an EPS bearer ID may be carried in a plurality of manners, for example, may be directly carried using a PCO information element in the bearer resource allocation request.

Step 315: The MME sends a bearer resource command message to the 5G gateway, where the bearer resource command message carries the correspondence between a PDU session ID and an EPS bearer ID.

In this embodiment, the MME receives the bearer resource allocation request forwarded by a radio access network device, and then sends the bearer resource command message to the 5G gateway, where the bearer resource command message carries the correspondence between a PDU session ID and an EPS bearer ID.

Step 316: The 5G gateway allocates the 5G network parameter to the user.

In this embodiment, because in step 311, the 5G gateway determines that the 5G network parameter needs to be allocated to the user, the 5G gateway allocates the 5G network parameter to the user after receiving the bearer resource command message.

For example, the 5G gateway allocates parameters such as a 5G QoS rule, a QoS flow description, and a traffic flow template to the user, such that the UE uses the parameters after moving to a 5G network.

Step 317: The 5G gateway sends the 5G network parameter to the MME using an update bearer request.

Step 318: The MME sends the 5G network parameter to the UE using a modify bearer request.

The modify bearer request that carries the 5G network parameter is forwarded to the UE through the radio access network device. After the UE receives the modify bearer request, bearer resource allocation is complete. In addition, the UE stores the 5G network parameter. The UE may further return a modify bearer response to the MME.

Subsequently, the UE moves from the 4G network to the 5G network, and the UE may continue to communicate with the 5G gateway. The 5G gateway further stores the correspondence between a PDU session identifier and an EPS bearer identifier, such that the 5G gateway may determine, based on an EPS bearer ID of the UE in the 4G network and the correspondence, an ID of a PDU session used by the UE in the 5G network, find the corresponding PDU session, and apply the allocated 5G network parameter to the PDU session.

In addition, in this embodiment, because the 5G network parameter has been sent to the UE in advance, after accessing the 5G network, the UE continues to perform the data service by directly using the previously stored 5G network parameter, without re-obtaining the 5G network parameter from the 5G gateway. This further improves service continuity.

In another optional embodiment, the create session request sent by the MIME to the 5G gateway in step 310 may not carry the indication information of the 5G capability of the UE, the indication information indicating that the user has subscribed to the 5G service, or the correspondence between a PDU session identifier and an EPS bearer identifier. Subsequently, after receiving the create session request, the SGW in the 5G gateway returns the create session response to the MME, to indicate that the session between the MIME and the SGW is created. In this embodiment, when the 5G gateway receives the bearer resource command message sent by the MIME (step 315), because the bearer resource command message carries a PDU session identifier, the 5G gateway may determine that the 5G network parameter needs to be allocated to the user. After allocating the 5G network parameter to the user, the 5G gateway sends the 5G network parameter to the MIME using the update bearer request. That is, the 5G gateway may determine, in advance (in step 311) or after step 315, that the 5G network parameter needs to be allocated to the user.

Figure 4:
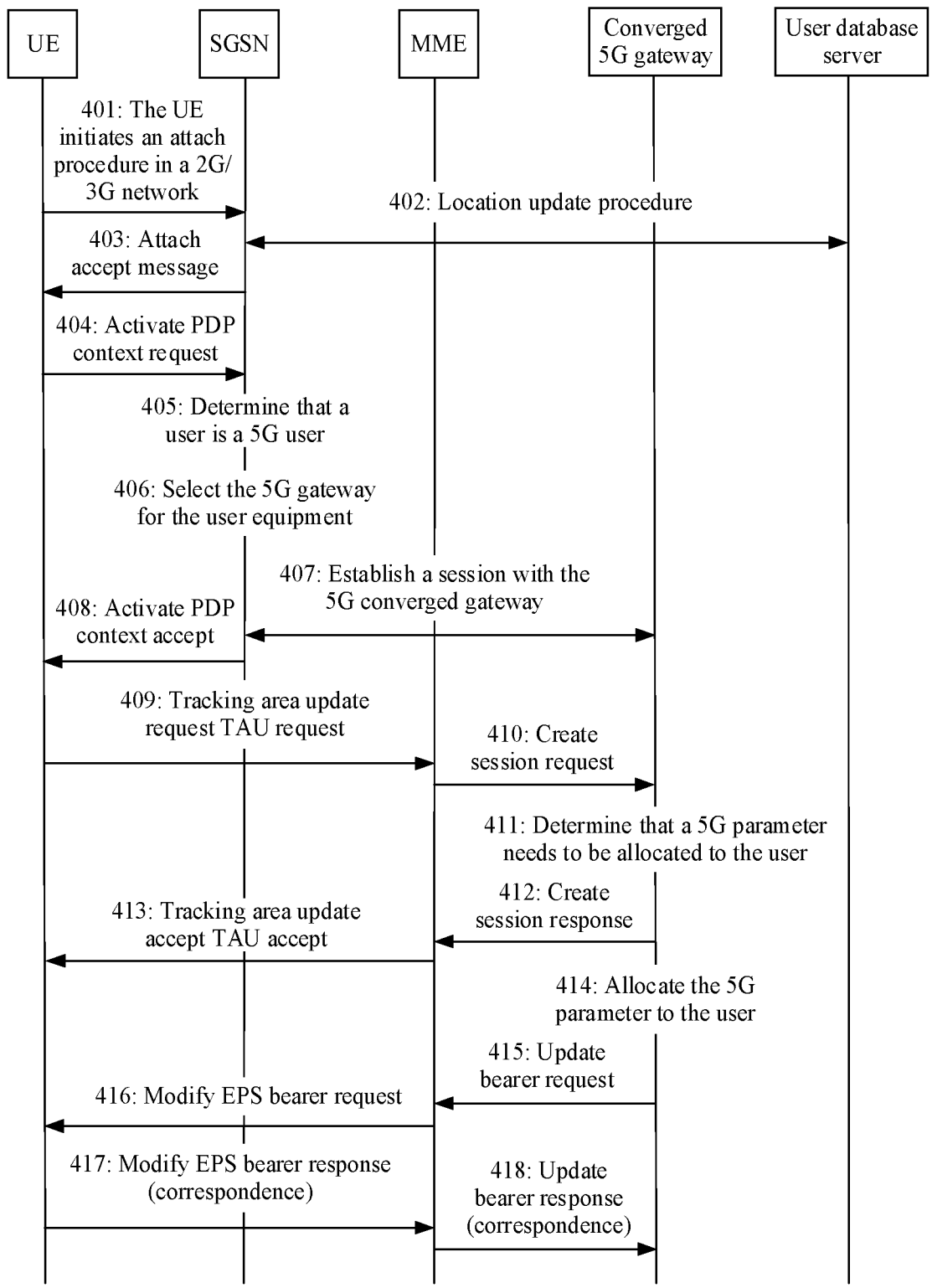
FIG. 4 is a flowchart of another service continuity implementation method according to an embodiment of this application.

FIG. 4 is a flowchart of another method according to an embodiment of this application.

The service continuity implementation method provided in this embodiment includes the following steps.

Step 401: 5G user equipment accesses a 2/3G network, and sends an attach request to the 2/3G network.

Step 402: An SGSN initiates location update to a user database server.

Step 403: The SGSN sends an attach accept message to the UE.

Step 404: The UE sends an activate PDP context request to the SGSN.

Step 405: The SGSN determines that a user corresponding to the UE is a 5G user.

Step 406: The SGSN selects a 5G gateway for the user equipment.

Step 407: The SGSN establishes a session with the 5G gateway.

Step 408: After completing establishment of the session with the 5G gateway, the SGSN returns an activate PDP context accept message to the UE.

Step 409: The UE sends a tracking area update request to an MME, to perform a tracking area update procedure.

Step 410: The MME sends a create session request to the 5G gateway, to create a session with the 5G gateway.

Step 411: The 5G gateway determines that a 5G network parameter needs to be allocated to the user.

Step 412: The 5G gateway sends a create session response to the MME.

Step 413: The MME sends a TUA accept message to the UE to complete the TAU procedure.

An execution process of steps 401 to 413 is the same as that of steps 301 to 313 in the foregoing embodiment. For details, refer to the foregoing embodiment, and the details are not repeated herein.

Step 414: The 5G gateway allocates the 5G network parameter to the user.

In this embodiment, because in step 411, the 5G gateway determines that the 5G network parameter needs to be allocated to the user, the 5G gateway actively allocates the 5G network parameter to the user.

For example, the 5G gateway allocates parameters such as a 5G QoS rule, a QoS flow description, and a traffic flow template to the user, such that the UE uses the parameters after moving to a 5G network.

Step 415: The 5G gateway sends an update bearer request to the MME, where the update bearer request carries the allocated 5G network parameter.

Step 416: The MME forwards the 5G network parameter to the UE using a modify EPS bearer request message.

The UE receives the modify EPS bearer request message sent by the MME, and stores the 5G network parameter carried in the modify EPS bearer request message.

Step 417: The UE returns a modify EPS bearer response message to the MME, where the modify EPS bearer response message carries a correspondence between a PDU session ID and an EPS bearer ID.

Step 418: The MME sends an update bearer response to the 5G gateway, where the update bearer response carries the correspondence between a PDU session ID and an EPS bearer ID.

After receiving the update bearer response, the 5G gateway stores the correspondence that is between a PDU session ID and an EPS bearer ID and that is carried in the update bearer response.

Subsequently, the UE moves from a 4G network to the 5G network, and the UE may continue to communicate with the 5G gateway. The 5G gateway further stores the correspondence between a PDU session identifier and an EPS bearer identifier, such that the 5G gateway may find, based on the correspondence, a PDU session used by the UE in the 5G network, and apply the allocated 5G network parameter to the PDU session.

In this embodiment, the 5G gateway may actively trigger a bearer update procedure without waiting for the UE to initiate a bearer resource allocation request, to send the 5G network parameter to the UE. Compared with the foregoing embodiment, this embodiment further improves efficiency and ensures service continuity of the UE.

Figure 5:
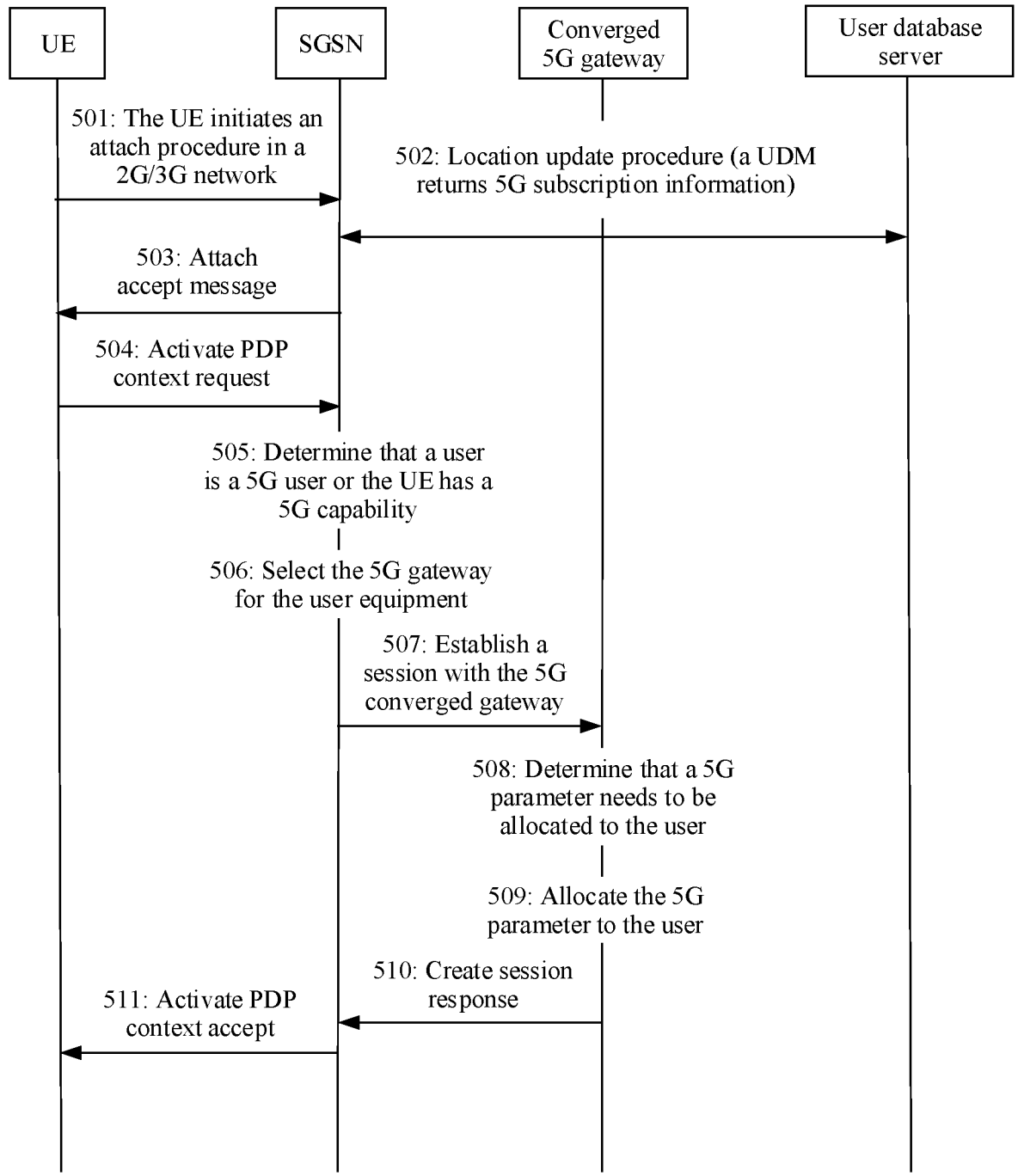
FIG. 5 is a flowchart of another service continuity implementation method according to an embodiment of this application.

FIG. 5 is a flowchart of another method according to an embodiment of this application.

The service continuity implementation method provided in this embodiment includes the following steps.

Step 501: 5G user equipment accesses a 2/3G network, and sends an attach request to the 2/3G network.

Step 502: An SGSN initiates location update to a user database server.

Step 503: The SGSN sends an attach accept message to the UE.

An execution process of steps 501 to 503 is the same as that of steps 201 to 203 in the foregoing embodiment. For details, refer to the foregoing embodiment, and the details are not repeated herein.

Step 504: The UE sends an activate PDP context request to the SGSN.

The activate PDP context request carries a correspondence between a PDU session identifier and a PDP context identifier.

Step 505: The SGSN determines that a user corresponding to the UE is a 5G user or the UE has a 5G capability.

The SGSN may determine, based on the correspondence between a PDU session identifier and a PDP context identifier, that the UE has the 5G capability, and that a 5G gateway further needs to be selected for the user equipment. In addition, the SGSN may alternatively determine, based on subscription information obtained during location update, that the user has subscribed to a 5G service (in other words, the user is the 5G user), and that a 5G gateway further needs to be selected for the user equipment.

Optionally, the SGSN may alternatively perform the step of selecting a 5G gateway for the user equipment only when determining that the user equipment has the 5G capability and the user has subscribed to the 5G service.

Step 506: The SGSN selects the 5G gateway for the user equipment.

An execution process of step 506 is the same as that of step 206 in the foregoing embodiment. For details, refer to the foregoing embodiment, and the details are not repeated herein.

Step 507: The SGSN establishes a session with the 5G gateway.

The step in which the SGSN establishes the session with the 5G gateway includes: An SGSN sends a create PDP session request to the 5G gateway, where the create PDP session request carries the correspondence between a PDU session identifier and a PDP context identifier. In addition, the request may further carry the 5G subscription information obtained by the SGSN from a UDM, for example, carry an Interworking 5GS Indicator parameter, to indicate that the user has subscribed to the 5G service. For example, a GGSN in the 5G gateway may receive the create PDP session request, and forward the correspondence between a PDU session identifier and a PDP context identifier, the 5G subscription information, and the like that are carried in the create PDP session request to an SMF, such that the SMF performs a subsequent procedure for allocating a 5G parameter to the user.

The 5G gateway may store the correspondence between a PDU session identifier and a PDP context identifier.

Step 508: The 5G gateway determines that the 5G network parameter needs to be allocated to the user.

The 5G gateway may determine, based on the correspondence between a PDU session identifier and a PDP context identifier, that the UE has the 5G capability, and that the 5G network parameter further needs to be allocated to the user. In addition, the 5G gateway may alternatively determine, based on the 5G subscription information carried in the create PDP session request, that the user has subscribed to the 5G service, and that the 5G network parameter further needs to be allocated to the user.

Step 509: The 5G gateway allocates the 5G network parameter to the user.

The 5G gateway may allocate parameters such as a 5G QoS rule, a QoS flow description, and a traffic flow template to the user, such that the UE uses the parameters after moving to a 5G network.

Step 510: The 5G gateway sends the 5G network parameter to the SGSN using a create PDP session response.

The 5G gateway returns the create PDP session response to the SGSN, where the response may carry a 2/3G network parameter, for example, QoS and an IP address, of the UE.

In this embodiment, the create PDP session response further carries the 5G network parameter allocated by the 5G gateway to the user.

Step 511: The SGSN sends an activate PDP context accept message to the UE, where the activate PDP context accept message carries the 5G network parameter.

The SGSN may return, to the UE using the activate PDP context accept message, the 5G network parameter allocated by the 5G gateway. In addition, the activate PDP context accept message further carries the 2/3G network parameter.

The UE receives the activate PDP context accept message sent by the SGSN, and stores the 2/3G network parameter and the 5G network parameter carried in the message. The UE may initiate a data service in the 2/3G network. Then, the UE moves from the 2/3G network to the 5G network (in a moving process, the UE may or may not pass through a 4G network), and the UE may continue to communicate with the 5G gateway. The 5G gateway further stores the correspondence between a PDU session identifier and a PDP context identifier, such that the 5G gateway can directly find a PDU session used by the UE in the 5G network, and apply the allocated 5G network parameter to the PDU session, to maintain service continuity.

Figure 6:
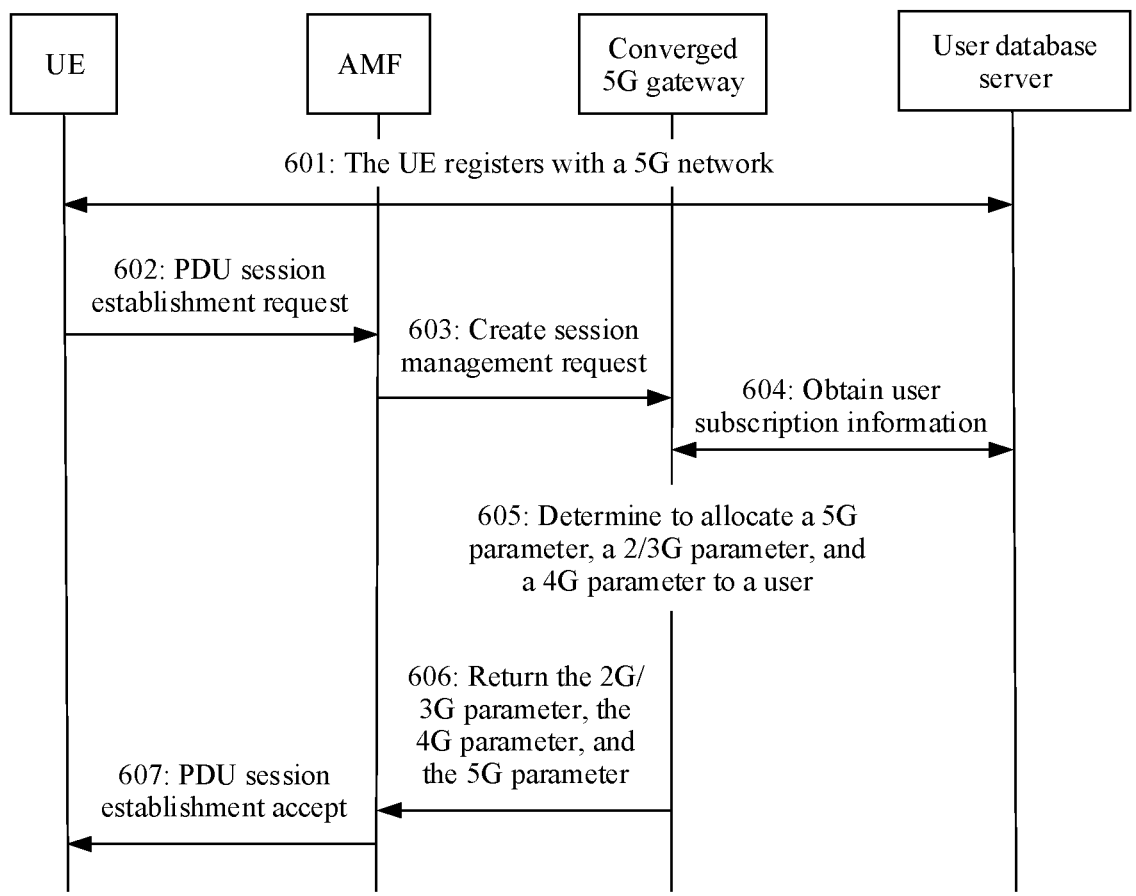
FIG. 6 is a flowchart of another service continuity implementation method according to an embodiment of this application.

FIG. 6 is a flowchart of another method according to an embodiment of this application.

The service continuity implementation method provided in this embodiment includes the following steps.

Step 601: 5G user equipment accesses a 5G network, and registers with a 5G core network.

A registration procedure includes user authentication and allocation of a user identifier, for example, a globally unique temporary identity. After the UE completes registration, the UE initiates a PDU session establishment procedure.

Devices involved in the registration procedure include the UE, an access management function (AMF) device, a user database server, and the like.

Step 602: The UE sends a PDU session establishment request to the AMF device, to request to establish a PDU session.

Step 603: The AMF sends a create session context management SM context request message to a 5G gateway.

In this embodiment, after receiving the PDU session establishment (establish) request sent by the UE, the AMF sends the create session management (SM) context request (CreateSMContext Request) to the 5G gateway through a service-oriented interface, to request to establish the PDU session.

In this embodiment, the 5G gateway may be a session management function (SMF) device, or may be a converged gateway that integrates functions of a GGSN, an SGW, a PGW, and an SMF. The 5G gateway in this embodiment may alternatively be a device that integrates control plane functions of an SMF and a GGSN, a control plane function of an SGW, and a control plane function of a PGW.

Step 604: The 5G gateway obtains user subscription information from the user database server.

Step 605: The 5G gateway allocates a 5G network parameter, and a 2/3G parameter and a 4G parameter that correspond to the 5G network parameter to a user.

In this embodiment, the user has subscribed to a 5G service. In this case, after obtaining the user subscription information, the SMF allocates the 5G network parameter to the user, for example, allocates parameters such as a 5G QoS rule, a QoS flow description, and a traffic flow template to the user. In addition, the 5G gateway further converts the 5G network parameter into the corresponding 2/3G network parameter and 4G network parameter.

Step 606: The 5G gateway returns the 5G network parameter, and the 2/3G parameter and the 4G parameter that correspond to the 5G network parameter to the AMF.

In this embodiment, the 5G gateway may send, to the AMF using an N1N2 message transfer message, the 2/3G network parameter, the 4G network parameter, and the 5G network parameter that are allocated to the user.

Step 607: The AMF sends a PDU session establishment accept message to the UE, where the PDU session establishment accept message carries the 2/3G network parameter, the 4G network parameter, and the 5G network parameter.

After receiving the PDU session establishment accept message, the UE stores the 2/3G network parameter, the 4G network parameter, and the 5G network parameter that are carried in the PDU session establishment accept message, and the UE performs a data service by directly using the 5G network parameter.

Subsequently, when moving from a 5G network to a 2/3G or 4G network, the UE does not need to re-obtain the network parameters from a core network device (for example, an SGSN or an MME), but directly communicates with the converged 5G gateway, and performs the data service using the pre-stored 2/3G network parameter and 4G network parameter, to maintain service continuity.

Figure 7:
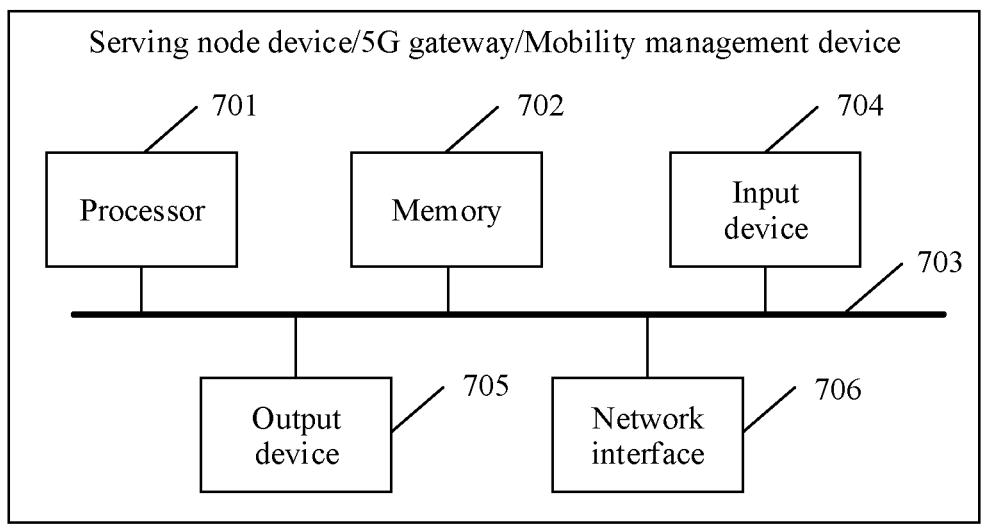
FIG. 7 is a schematic diagram of a serving node device, a 5G gateway, and a mobility management device according to an embodiment of this application.

FIG. 7 is a schematic diagram of a serving node device, a 5G gateway, and a mobility management device according to an embodiment of this application.

The serving node device, the 5G gateway, and the mobility management device provided in this embodiment all use universal computer hardware, including a processor 701, a memory 702, a bus 703, an input device 704, an output device 705, and the like.

For example, the memory 702 may include a computer storage medium in a form of a volatile memory and/or a non-volatile memory, for example, a read-only memory and/or a random access memory. The memory 702 may store an operating system, an application program, another program module, executable code, program data, user registration data, user subscription data, or the like.

The input device 704 may be configured to input a command and information to the serving node device. The input device 704 is a keyboard or a pointing device, such as a mouse, a trackball, a touchpad, a microphone, a joystick, a game pad, a satellite television antenna, a scanner, or a similar device. These input devices may be connected to the processor 701 through the bus 703.

The output device 705 may be used by the serving node device to output information. The output device 705 may be a display, or may be another peripheral output device, such as a loudspeaker and/or a print device. These output devices may also be connected to the processor 701 through the bus 703.

The serving node device may be connected to a network, for example, a local area network (LAN), through a network interface 706. In a network connection environment, computer-executable instructions may alternatively be stored in a remote storage device, in addition to being locally stored in the serving node device.

When the processor 701 in the serving node device executes the executable code or the application program stored in the memory 702, the serving node device may perform method steps on a serving node device side in the foregoing embodiments, for example, perform steps 203, 204, 206, 303, 304, and 307. For an execution process, refer to the foregoing embodiments. Details are not described herein again.

When the processor 701 in the mobility management device executes the executable code or the application program stored in the memory 702, the mobility management device may perform method steps on a mobility management device side in the foregoing embodiments, for example, perform steps 210, 213, 310, 312, 416, and 418. For an execution process, refer to the foregoing embodiments. Details are not described herein again.

When the processor 701 in the 5G gateway executes the executable code or the application program stored in the memory 702, the 5G gateway may perform method steps on a 5G gateway side in the foregoing embodiments, for example, perform steps 207, 307, 311, 312, 411, 412, 508, 509, 605, and 606. For an execution process, refer to the foregoing embodiments. Details are not described herein again.

Figure 8:
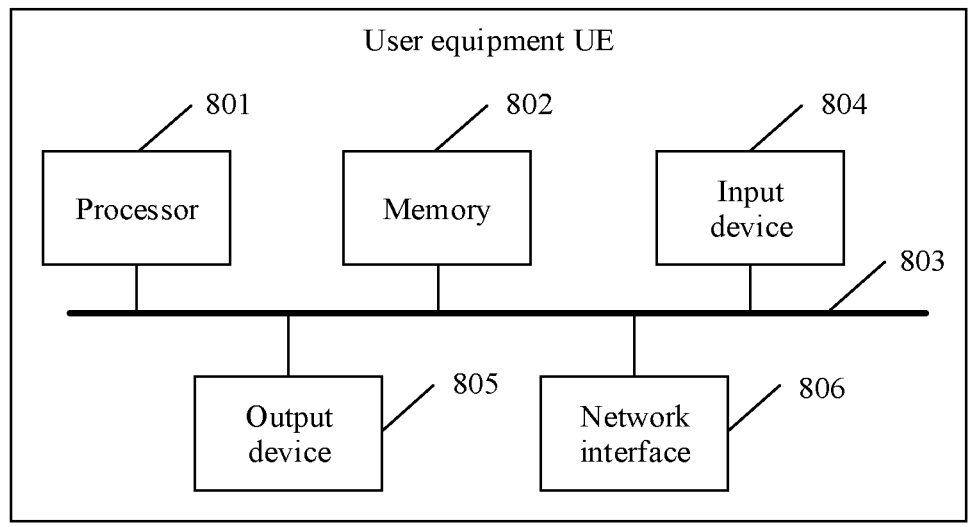
FIG. 8 is a schematic diagram of user equipment according to an embodiment of this application.

FIG. 8 is a schematic diagram of a user equipment according to an embodiment of this application.

The user equipment includes a processor 801, a memory 802, a bus 803, an input device 804, an output device 805, and a network interface 806. In addition, the user equipment may further include components such as an application processor (AP) and a battery.

For example, the memory 802 may include a computer storage medium in a form of a volatile memory and/or a non-volatile memory, for example, a read-only memory and/or a random access memory. The memory 802 may store an operating system, an application program, another program module, executable code, and program data.

The input device 804 may be configured to input a command and information to the user equipment. The input device 804 is a keyboard or a pointing device, such as a mouse, a trackball, a touchpad, a microphone, a joystick, a game pad, a parabolic satellite television antenna, a scanner, or a similar device. These input devices may be connected to the processor 801 through the bus 803.

The output device 805 may be used by the user equipment to output information. The output device 805 may be a display, or may be another peripheral output device, such as a loudspeaker. These output devices may also be connected to the processor 801 through the bus 803.

The user equipment may be connected to a network through the network interface 806, for example, connected to a Wi-Fi network, a 5G network, a 2/3G network, or a 4G network through a wireless interface. In a network connection environment, computer-executable instructions may alternatively be stored in a remote storage device, in addition to being locally stored in the user equipment.

When the processor 801 in the user equipment executes the executable code or the application program stored in the memory 802, the user equipment may perform method steps on a user equipment side in the foregoing embodiments, for example, perform steps 209, 213, 314, 318, 401, 416, 504, and 511. For an execution process and a beneficial effect, refer to the foregoing related embodiments. Details are not described herein again.

Figure 9:
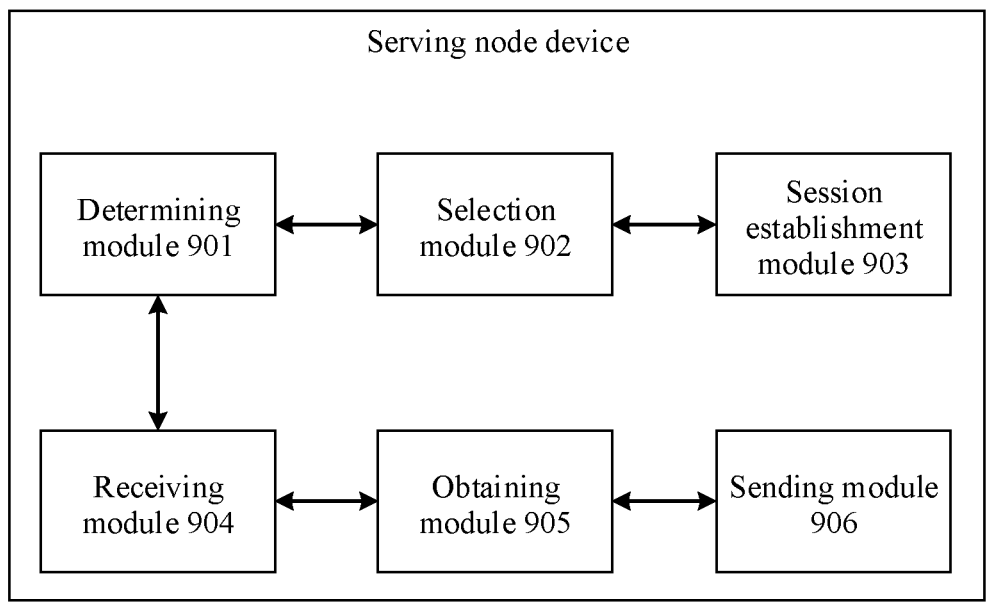
FIG. 9 is a schematic diagram of a serving node device according to an embodiment of this application.

FIG. 9 is a schematic diagram of a serving node device according to an embodiment of this application.

As shown in FIG. 9, the serving node device includes a determining module 901, a selection module 902, and a session establishment module 903.

The determining module 901 is configured to: when a user equipment is attached to a 2/3G network, determine that the user equipment has a 5G capability or a user corresponding to the user equipment is a 5G user.

The selection module 902 is configured to select a 5G gateway for the user equipment.

The session establishment module 903 is configured to establish a session with the 5G gateway.

The serving node device provided in this embodiment may be used in the service continuity implementation method provided in the foregoing embodiments, to implement service continuity of the user equipment through collaboration among the determining module 901, the selection module 902, and the session establishment module 903, and resolve a service interruption problem in a conventional technology that is caused by movement of the user equipment from the 2/3G network to a 5G network.

In the serving node device provided in this application, that the determining module 901 determines that the user corresponding to the user equipment is the 5G user includes: receiving an attach request sent by the user equipment, where the attach request carries a user identifier; obtaining, from a user database server based on the user identifier, subscription data of the user corresponding to the user equipment; and then determining, based on the subscription data, that the user is the 5G user.

The serving node device provided in this application further includes a receiving module 904 configured to receive an attach request sent by the user equipment, where the attach request carries the 5G capability of the user equipment. In this case, the determining module 901 determines, based on the received attach request, that the user equipment has the 5G capability. In addition, the receiving module 904 is further configured to receive a bearer allocation request sent by the user equipment.

The serving node device provided in this application further includes: an obtaining module 905 configured to obtain a 5G network parameter of the user equipment from the 5G gateway after the bearer allocation request sent by the user equipment is received; and a sending module 906 configured to send the 5G network parameter to the user equipment using a bearer allocation response, such that the user equipment may receive the bearer allocation response, and store the 5G network parameter carried in the bearer allocation response, to directly use the 5G parameter after subsequently moving to a 5G network.

In the serving node device provided in this application, the receiving module 904 is further configured to receive an activate context request message sent by the user equipment, where the activate context request message carries a protocol data unit (PDU) session identifier.

That the session establishment module 903 in the serving node device establishes the session with the 5G gateway includes: sending a create PDP context request message to the 5G gateway, where the create PDP context request message is used to request to create a PDP context for the user equipment, and the create PDP context request message carries the PDU session identifier; and receiving a create PDP context response message sent by the 5G gateway, to create the session between the serving node device and the 5G gateway.

The create PDP context response carries a 5G network parameter allocated to the user equipment. The sending module 906 in the serving node device is further configured to send an activate context response message to the user equipment, where the activate context response message carries the 5G network parameter.

In the serving node device provided in this application, that the selection module 902 selects the 5G gateway for the user equipment includes: generating a FQDN of the 5G gateway, or obtaining a FQDN of the 5G gateway from a domain name system; and requesting, using the FQDN, the domain name system to perform address resolution to obtain an address of the 5G gateway.

The serving node device in the foregoing embodiment is presented in a form of functional modules. The "module" herein may be an application-specific integrated circuit, a processor and a memory that execute one or more software or firmware programs, an integrated logic circuit, and/or another component that can provide the foregoing functions.

In the serving node device provided in the foregoing embodiment, functions implemented by the functional modules such as the determining module 901 and the selection module 902 in the serving node device may all be implemented using the processor 701 and the memory 702 in FIG. 7. For example, the function of the determining module 901 in determining that the user equipment has the 5G capability or that the user corresponding to the user equipment is the 5G user may be implemented by the processor 701 by executing the code stored in the memory 702. The function of the selection module 902 in selecting the 5G gateway for the user equipment may also be implemented by the processor 701 by executing the code stored in the memory 702.

Figure 10:
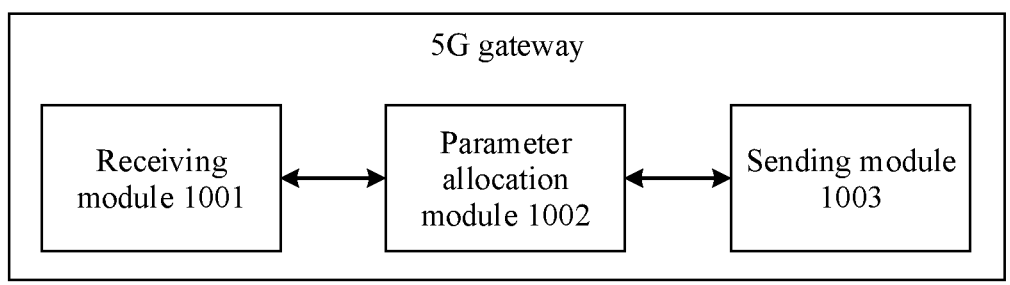
FIG. 10 is a schematic diagram of a 5G gateway according to an embodiment of this application.

FIG. 10 is a schematic diagram of a 5G gateway according to an embodiment of this application.

As shown in FIG. 10, the 5G gateway may include a receiving module 1001, a parameter allocation module 1002, and a sending module 1003.

The receiving module 1001 is configured to receive a create session request sent by a mobility management device or a serving node device, where the create session request carries indication information indicating that user equipment has a 5G capability or a user has subscribed to a 5G service.

The parameter allocation module 1002 is configured to allocate a 5G network parameter to the user.

The sending module 1003 is configured to send the allocated 5G network parameter to the mobility management device or the serving node device.

The 5G gateway provided in this embodiment may be used in the service continuity implementation method provided in the foregoing embodiments, to implement service continuity of the user equipment through collaboration among the receiving module 1001, the parameter allocation module 1002, and the sending module 1003, and resolve a service interruption problem in a conventional technology that is caused by movement of the user equipment from a 2/3G network to a 5G network.

In the 5G gateway provided in this embodiment, the sending module 1003 may send the allocated 5G network parameter to the mobility management device using a create session response message or an update bearer request message. In addition, the sending module 1003 may further send the allocated 5G network parameter to the serving node device using the create session response message, such that the serving node device or the mobility management device forwards the 5G network parameter to the user equipment. In this way, the user equipment may use the 5G network parameter after moving to the 5G network.

In the 5G gateway provided in this embodiment, the receiving module 1001 is further configured to receive a correspondence that is between a PDU session identifier and a bearer identifier and that is sent by the mobility management device or the serving node device. In this case, the 5G gateway further includes a parameter application module configured to determine, based on the correspondence, a PDU session corresponding to the user equipment, and then apply the 5G network parameter to the PDU session.

In the 5G gateway provided in this embodiment, the parameter allocation module 1002 is further configured to allocate a 2/3G network parameter and a 4G network parameter that correspond to the 5G network parameter to the user. In this case, the sending module 1003 in the 5G gateway is further configured to send the 2/3G network parameter and the 4G network parameter to the mobility management device or the serving node device. Therefore, the user equipment may store the 2/3G network parameter, the 4G network parameter, and the 5G network parameter for subsequent use.

The 5G gateway in the foregoing embodiment is presented in a form of functional modules. The "module" herein may be an application-specific integrated circuit, a processor and a memory that execute one or more software or firmware programs, an integrated logic circuit, and/or another component that can provide the foregoing functions.

In the 5G gateway provided in the foregoing embodiment, functions implemented by the functional modules such as the receiving module 1001 and the parameter allocation module 1002 in the 5G gateway may all be implemented using the processor 701 and the memory 702 in FIG. 7. For example, the function of the receiving module 1001 in receiving the create session request sent by the mobility management device or the serving node device may be implemented by the processor 701 by executing the code stored in the memory 702. The function of the parameter allocation module 1002 in allocating the 5G network parameter to the user may also be implemented by the processor 701 by executing the code stored in the memory 702.

Figure 11:
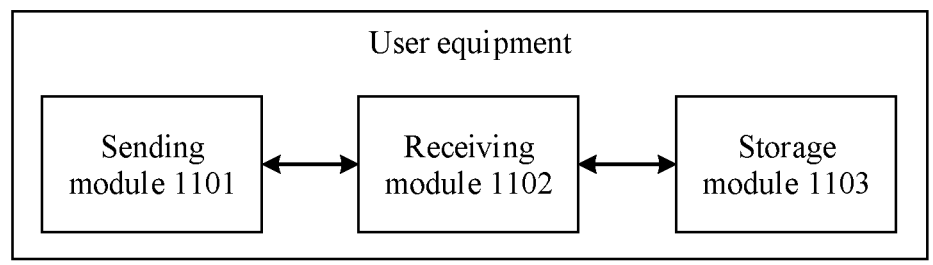
FIG. 11 is a schematic diagram of user equipment according to an embodiment of this application.

FIG. 11 is a schematic diagram of user equipment according to an embodiment of this application.

As shown in FIG. 11, the user equipment may include a sending module 1101 and a receiving module 1102.

The sending module 1101 is configured to: when user equipment accesses a 2/3G network, send an activate PDP context request message to a serving node device to activate a PDP context, where the activate PDP context request message carries indication information indicating that the user equipment has a 5G capability.

The receiving module 1102 is configured to receive an activate PDP context response message sent by the serving node device, where the activate PDP context request message carries a 5G network parameter. Therefore, when subsequently moving to a 5G network, the user equipment uses the 5G network parameter.

In this embodiment of this application, the sending module 1101 in the user equipment may alternatively send a tracking area update request message to a mobility management device to perform tracking area update, where the tracking area update request message carries indication information indicating that the user equipment has a 5G capability. Then, the receiving module 1102 in the user equipment may further receive a tracking area update response message sent by the mobility management device, where the tracking area update response message carries a 5G network parameter.

In this embodiment of this application, the tracking area update response message received by the receiving module 1102 further carries a 2/3G network parameter and a 4G network parameter that correspond to the 5G network parameter.

In this embodiment of this application, the sending module 1101 in the user equipment may alternatively send a bearer resource allocation request message to a mobility management device, to request to allocate a bearer resource, where the bearer resource allocation request message carries indication information indicating that the user equipment has a 5G capability. Then, the receiving module 1102 in the user equipment receives a bearer resource allocation response message sent by the mobility management device, where the bearer resource allocation response message carries a 5G network parameter.

In this embodiment of this application, the bearer resource allocation response message received by the receiving module 1102 further carries a 2/3G network parameter and a 4G network parameter that correspond to the 5G network parameter.

In this embodiment of this application, the sending module 1101 in the user equipment may alternatively send an activate PDP context request to a mobility management device, where the activate PDP context request carries indication information indicating that the user equipment has a 5G capability. Then, the receiving module 1102 in the user equipment receives an activate PDP context response sent by the mobility management device, where the activate PDP context response carries a 5G network parameter.

In this embodiment of this application, the activate PDP context response message received by the receiving module 1102 in the user equipment further carries a 2/3G network parameter and a 4G network parameter that correspond to the 5G network parameter.

In this embodiment of this application, the receiving module 1102 in the user equipment may alternatively receive a modify bearer context request message sent by a mobility management device, where the modify bearer context request message carries a 5G network parameter. Then, a storage module 1103 in the user equipment may store the 5G network parameter; and when subsequently moving to a 5G network, the user equipment directly uses the 5G network parameter, to maintain service continuity.

In this embodiment of this application, the sending module 1101 in the user equipment may further send a modify bearer context accept message to the mobility management entity, where the modify bearer context accept message carries a correspondence between a PDU session identifier and an EPS bearer identifier.

In this embodiment of this application, the indication information indicating that the user equipment has the 5G capability is at least one of a PDU session identifier, the correspondence between a PDU session identifier and an EPS bearer identifier, and a correspondence between a PDU session identifier and a PDP context identifier.

In this embodiment of this application, the sending module 1101 in the user equipment may further send a PDU session establishment request to an AMF, to establish a PDU session.

The receiving module 1102 in the user equipment further receives a PDU session establishment complete message sent by the AMF, where the PDU session establishment complete message carries a 5G network parameter, and a 2/3G network parameter and a 4G network parameter that correspond to the 5G network parameter.

The storage module 1103 in the user equipment may store the 2/3G network parameter and the 4G network parameter; and when subsequently moving to the 2/3G network or a 4G network, the user equipment directly uses the 2/3G network parameter and the 4G network parameter without obtaining these parameters from a core network device. This further improves service continuity.

In the user equipment provided in the foregoing embodiment, functions implemented by the functional modules such as the sending module 1101 and the receiving module 1102 may all be implemented using the processor 801 and the memory 802 in FIG. 8. For example, the function of the receiving module 1102 in receiving the PDU session establishment complete message sent by the AMF may be implemented by the processor 801 by executing the code stored in the memory 802. The function of the sending module 1101 in sending the PDU session establishment request to the AMF may also be implemented by the processor 801 by executing the code stored in the memory 802.

The foregoing descriptions are merely examples of implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service continuity implementation method, comprising:
    receiving, by a serving node device, an attach request from a user equipment, wherein the attach request carries a user identifier;
    obtaining, by the serving node device from a user database server based on the user identifier, subscription data of a user corresponding to the user equipment;
    sending, by the serving node device, an attach accept message to the user equipment for attaching the user equipment to a $2^{nd}$ generation (2G)/$3^{rd}$ generation (3G) network;
    after the user equipment is attached to the 2G/3G network, determining, by the serving node device based on the subscription data that the user is a 5th generation (5G) user;
    selecting, by the serving node device, a 5G gateway for the user equipment based on the determination; and
    establishing a session with the 5G gateway.

2. The service continuity implementation method of claim 1, wherein the attach request further carries information indicating that the user equipment has the 5G capability.

3. The service continuity implementation method of claim 1, wherein establishing the session with the 5G gateway comprises:
    sending, by the serving node device, a create packet data protocol (PDP) session request to the 5G gateway; and
    receiving a create PDP session response from the 5G gateway.

4. The service continuity implementation method of claim 1, further comprising:
    obtaining, by a mobility management device after receiving a tracking area update request from the user equipment, a 5G network parameter of the user from the 5G gateway; and
    sending, by the mobility management device, the 5G network parameter to the user equipment using a tracking area update response.

5. The service continuity implementation method of claim 4, wherein the tracking area update request further carries a correspondence between a session identifier and a bearer identifier, and wherein the service continuity implementation method further comprises:
- sending, by the mobility management device, the correspondence using a create session request message; and
- receiving, by the mobility management device, a create session response message from the 5G gateway, wherein the create session response message carries the 5G network parameter.

6. The service continuity implementation method of claim 1, further comprising:
- obtaining, by the serving node device after receiving a bearer resource allocation request from the user equipment, a 5G network parameter of the user from the 5G gateway; and
- sending, by the serving node device, the 5G network parameter to the user equipment using a bearer allocation response.

7. The service continuity implementation method of claim 6, wherein the bearer resource allocation request carries a correspondence between a session identifier and a bearer identifier, and wherein the service continuity implementation method further comprises:
- sending, by a mobility management device, the correspondence to the 5G gateway using a bearer resource command request; and
- receiving, by the mobility management device, an update bearer request from the 5G gateway, wherein the update bearer request carries the 5G network parameter.

8. The service continuity implementation method of claim 1, further comprising:
- receiving, by a mobility management device, a 5G network parameter of the user from the 5G gateway; and
- sending, by the mobility management device, the 5G network parameter to the user equipment.

9. The service continuity implementation method of claim 8, further comprising:
- receiving, by the mobility management device, a modify evolved packet system (EPS) bearer response from the user equipment, wherein the modify EPS bearer response carries a correspondence between a session identifier and a bearer identifier; and
- sending, by the mobility management device, the correspondence to the 5G gateway.

10. The service continuity implementation method of claim 1, further comprising receiving, by the serving node device, an activate packet data protocol (PDP) context request message from the user equipment, wherein the activate PDP context request message carries a protocol data unit (PDU) session identifier, and wherein establishing, by the serving node device, the session with the 5G gateway comprises:
- sending, by the serving node device, a create PDP context request message to the 5G gateway, wherein the create PDP context request message requests to create a PDP context for the user equipment and carries the PDU session identifier; and
- receiving, by the serving node device, a create PDP context response message from the 5G gateway.

11. The service continuity implementation method of claim 1, wherein selecting the 5G gateway for the user equipment comprises:
- generating, by the serving node device, a fully qualified domain name (FQDN) of the 5G gateway or obtaining the FQDN from a domain name system; and
- requesting, using the FQDN, the domain name system to perform address resolution to obtain an address of the 5G gateway.

12. The service continuity implementation method of claim 1, wherein the user identifier is at least one of a globally unique temporary identity, an international mobile subscriber identity, a mobile station international subscriber direction number (ISDN) number, an Internet Protocol (IP) multimedia private identity, an IP multimedia public identity, and an international mobile device identity of the user.

13. A serving node device, comprising:
- a non-volatile memory configured to store instructions; and
- a processor coupled to the memory and configured to execute the instructions to cause the serving node device to:
  - receive an attach request from a user equipment, wherein the attach request carries a user identifier;
  - obtain, from a user database server based on the user identifier, subscription data of a user corresponding to the user equipment;
  - send an attach accept message to the user equipment for attaching the user equipment to a $2^{nd}$ generation (2G)/$3^{rd}$ generation (3G) network;
  - determine, based on the subscription data after the user equipment is attached to the 2G/3G network, that the user is a 5th generation (5G) user;
  - select a 5G gateway for the user equipment based on the determination; and
  - establish a session with the 5G gateway.

14. The serving node device of claim 13, wherein the attach request further carries information indicating that the user equipment has 5G capability.

15. The serving node device of claim 13, wherein the processor is configured to select the 5G gateway for the user equipment by executing the instructions to cause the serving node device to:
- generate a fully qualified domain name (FQDN) of the 5G gateway or obtaining the FQDN from a domain name system; and
- request, using the FQDN, the domain name system to perform address resolution to obtain an address of the 5G gateway.

16. A communication system, comprising:
- a 5th generation (5G) gateway; and
- a serving node device configured to:
  - receive an attach request from a user equipment, wherein the attach request carries a user identifier;
  - obtain, from a user database server based on the user identifier, subscription data of a user corresponding to the user equipment;
  - send an attach accept message to the user equipment for attaching the user equipment to a $2^{nd}$ generation (2G)/$3^{rd}$ generation (3G) network;
  - determine, based on the subscription data after the user equipment is attached to the 2G/3G network, that the user is a 5th generation (5G) user;
  - select the 5G gateway for the user equipment based on the determination; and
  - establish a session between the serving node device and the 5G gateway.

17. The communication system of claim 16, wherein the 5G gateway is configured to:
- receive a create session request from a mobility management device or the serving node device, wherein the create session request carries information indicating that the user is the 5G user;

allocate a 5G network parameter to the user based on the create session request; and send the 5G network parameter to the mobility management device or the serving node device.

18. The communication system of claim 16, wherein the attach request further carries information indicating that the user equipment has 5G capability.

19. The communication system of claim 16, wherein the 5G gateway is configured to select the 5G gateway for the user equipment by:

generating, by the serving node device, a fully qualified domain name (FQDN) of the 5G gateway or obtaining the FQDN from a domain name system; and requesting, using the FQDN, the domain name system to perform address resolution to obtain an address of the 5G gateway.

\* \* \* \* \*